United States Patent [19]

Crawley et al.

[11] Patent Number: 4,928,246

[45] Date of Patent: May 22, 1990

[54] MULTIPLE CHANNEL DATA ACQUISITION SYSTEM

[75] Inventors: H. Bert Crawley; Eli I. Rosenberg; W. Thomas Meyer; Mark S. Gorbics, all of Ames; William D. Thomas, Boone; Roy L. McKay; John F. Homer, Jr., both of Ames, all of Iowa

[73] Assignee: Iowa State University Research Foundation, Inc., Ames, Iowa

[21] Appl. No.: 261,031

[22] Filed: Oct. 21, 1988

[51] Int. Cl.$^5$ .................... G06K 15/00; H04J 3/00
[52] U.S. Cl. .................... 364/514; 364/137; 364/550; 340/825; 340/825.06; 341/142
[58] Field of Search ............ 364/514, 550, 137, 138, 364/140, 148, 178, 179; 340/825.06, 825; 341/141, 142, 155

[56] References Cited

U.S. PATENT DOCUMENTS

| | | | |
|---|---|---|---|
| 4,315,330 | 2/1982 | Brickman et al. | 364/514 |
| 4,347,563 | 8/1982 | Paredes et al. | 364/137 |
| 4,745,559 | 5/1988 | Willis et al. | 364/514 |
| 4,750,135 | 6/1988 | Boilen | 364/514 |
| 4,750,137 | 6/1988 | Harper et al. | 364/514 |
| 4,757,460 | 7/1988 | Bione et al. | 364/514 |
| 4,811,195 | 3/1989 | Evans | 364/138 |

OTHER PUBLICATIONS

W. T. Meyer et al., "A Simple Microprocessor for FASTBUS Slave Modules", AMES Laboratory, ISJ 2949, Sep. 8, 1988.
Letter to Gordon Charleton of United States Department of Energy from Alexander Firestone of AMES Laboratory dated Jun. 9, 1986 concerning a project summary of subject matter related to the disclosure in the application.
H. Bert Crawley et al., "A 15 MHz 32 Channel Flash ADC FASTBUS for Use at LEP", IEEE 1987 Nuclear Science Symposium, Oct. 1987.
H. Bert Crawley et al., "The DELPHI Barrel Electromagnetic Calorimeter Flash ADC Based Digitizer", IEEE 1986 Nuclear Science Symposium, IEEE Transactions in Nuclear Science NS-34 261 (1987).
H. Bert Crawley et al., "Design and Performance or a CCD Based Readout for the DELPHI Barrel Electromagnetic Calorimeter", IEEE 1985 Nuclear Science Symposium, IEEE Transactions in Nuclear Science, NS-33 888 (1986).

Primary Examiner—Parshotam S. Lall
Assistant Examiner—Brian M. Mattson
Attorney, Agent, or Firm—Welsh & Katz, Ltd.

[57] ABSTRACT

A multiple channel data acquisition system for the transfer of large amounts of data from a multiplicity of data channels has a plurality of modules which operate in parallel to convert analog signals to digital data and transfer that data to a communications host via a FASTBUS. Each module has a plurality of submodules which include a front end buffer (FEB) connected to input circuitry having an analog to digital converter with cache memory for each of a plurality of channels. The submodules are interfaced with the FASTBUS via a FASTBUS coupler which controls a module bus and a module memory. The system is triggered to effect rapid parallel data samplings which are stored to the cache memories. The cache memories are uploaded to the FEBs during which zero suppression occurs. The data in the FEBs is reformatted and compressed by a local processor during transfer to the module memory. The FASTBUS coupler is used by the communications host to upload the compressed and formatted data from the module memory. The local processor executes programs which are downloaded to the module memory through the FASTBUS coupler.

30 Claims, 20 Drawing Sheets

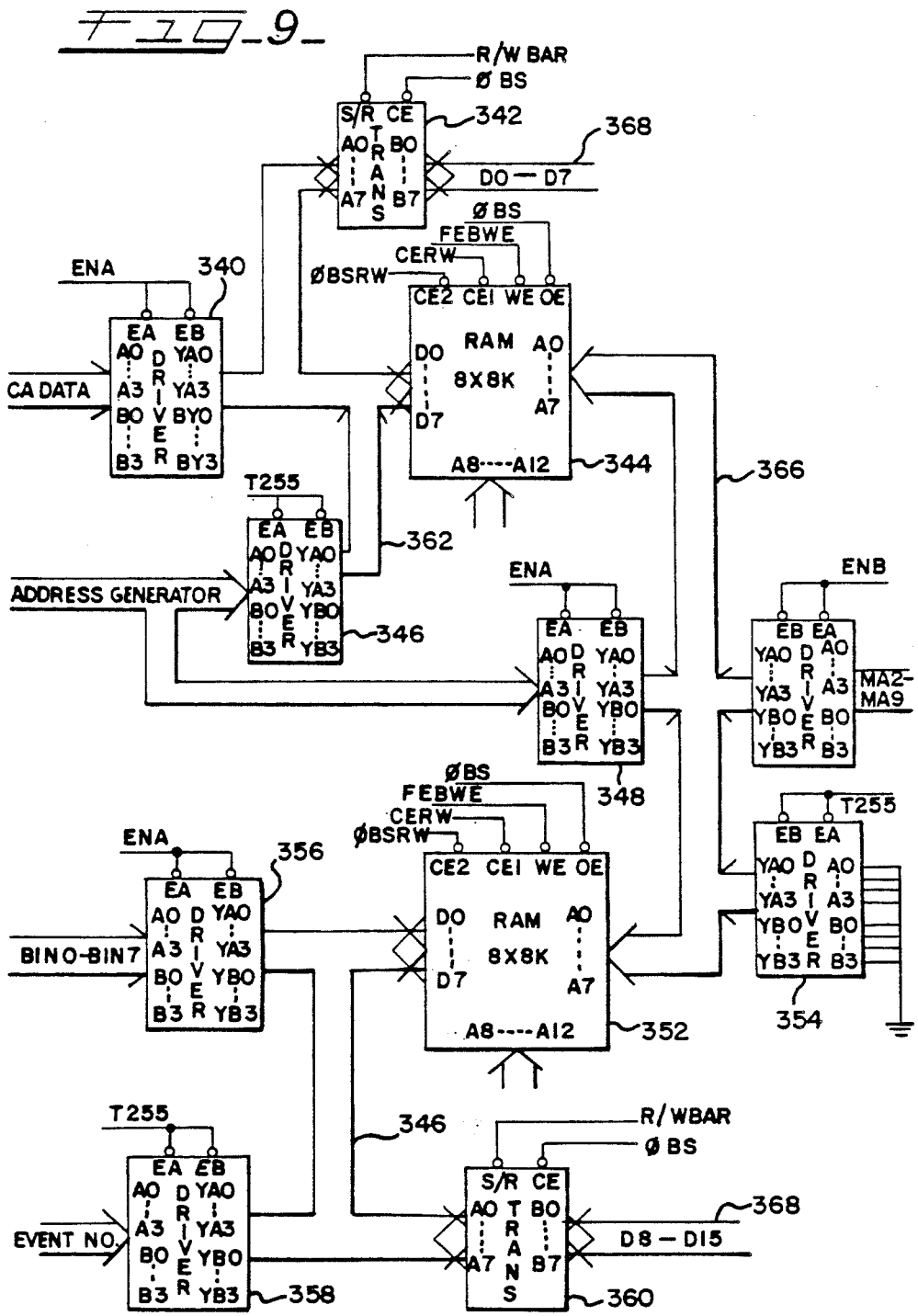

FIG-10-
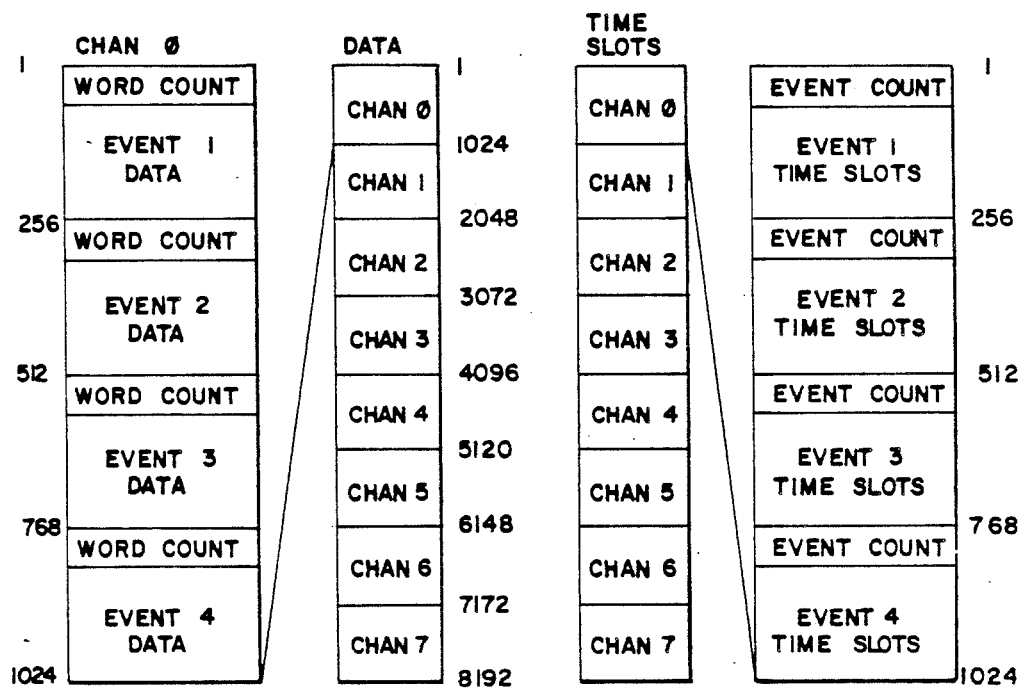
FIG-11-
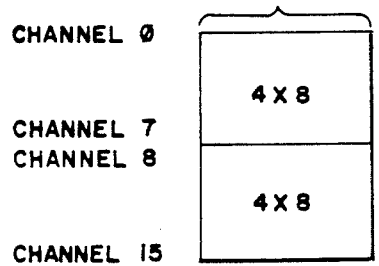
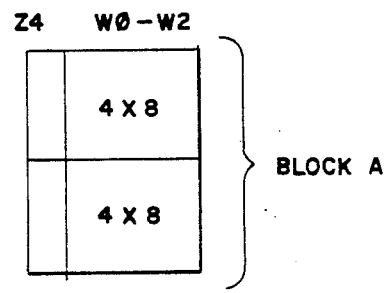
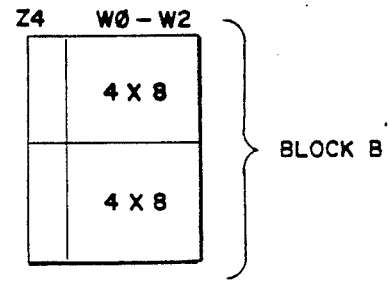

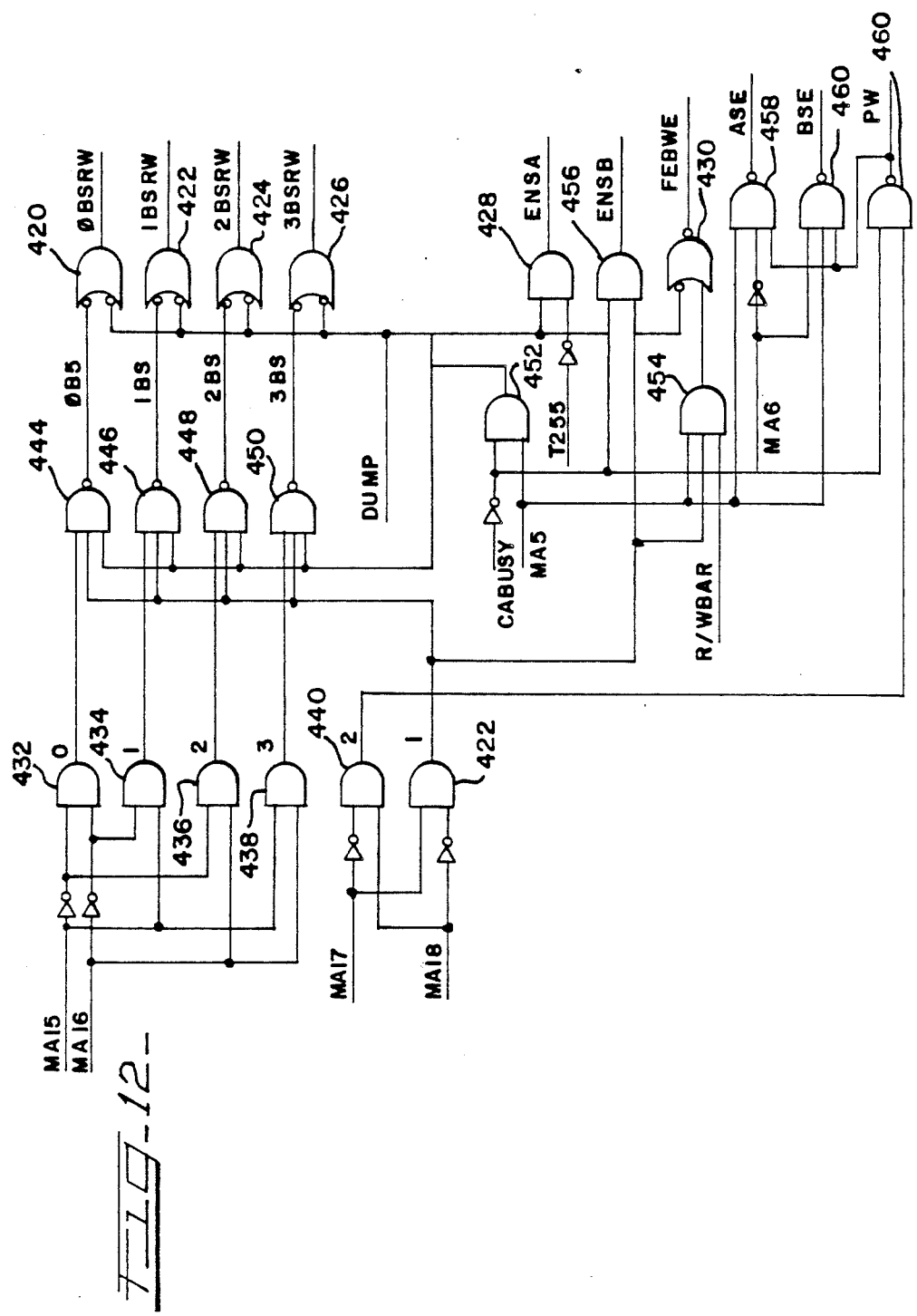
_Fig. 12_

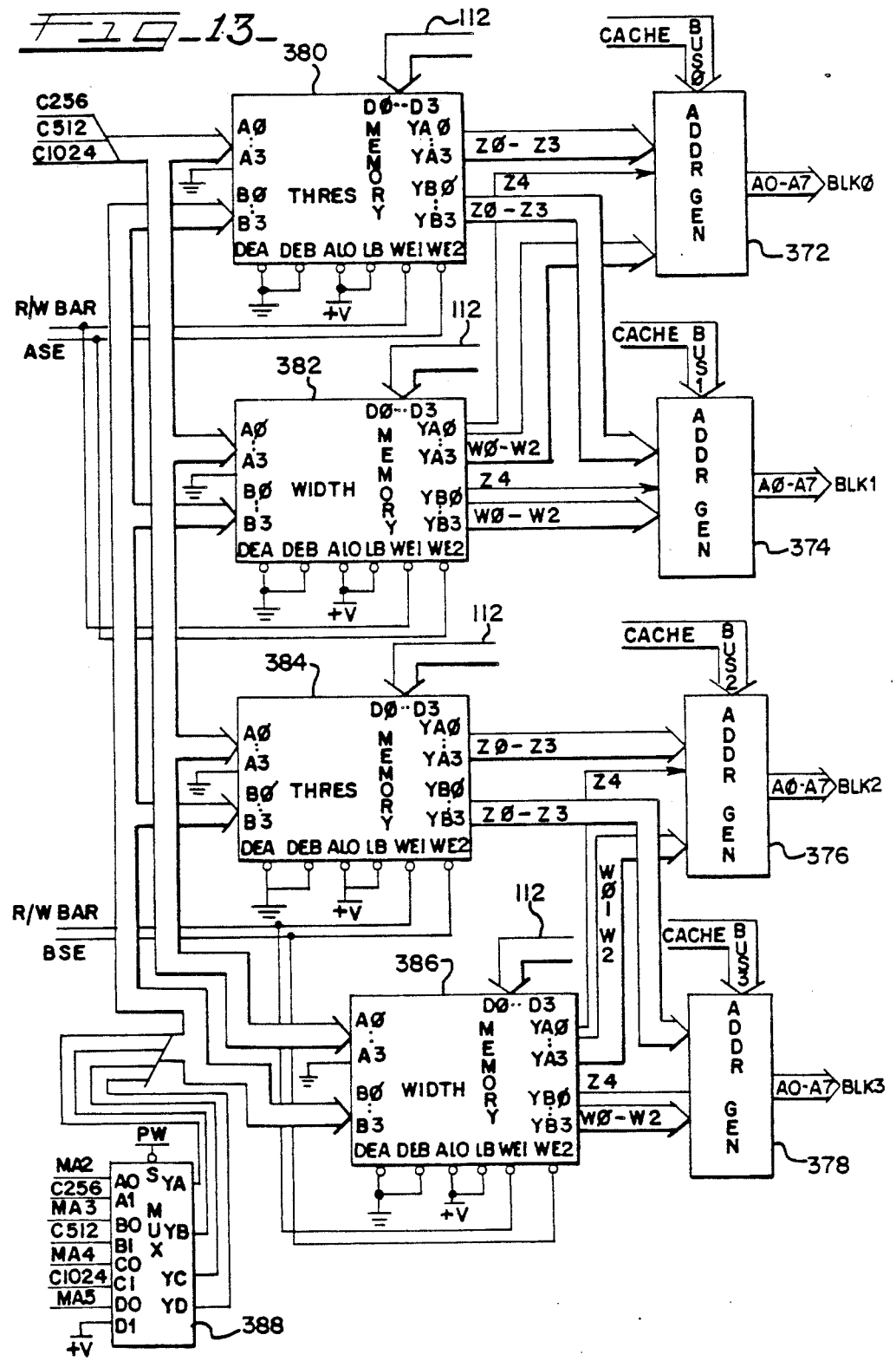

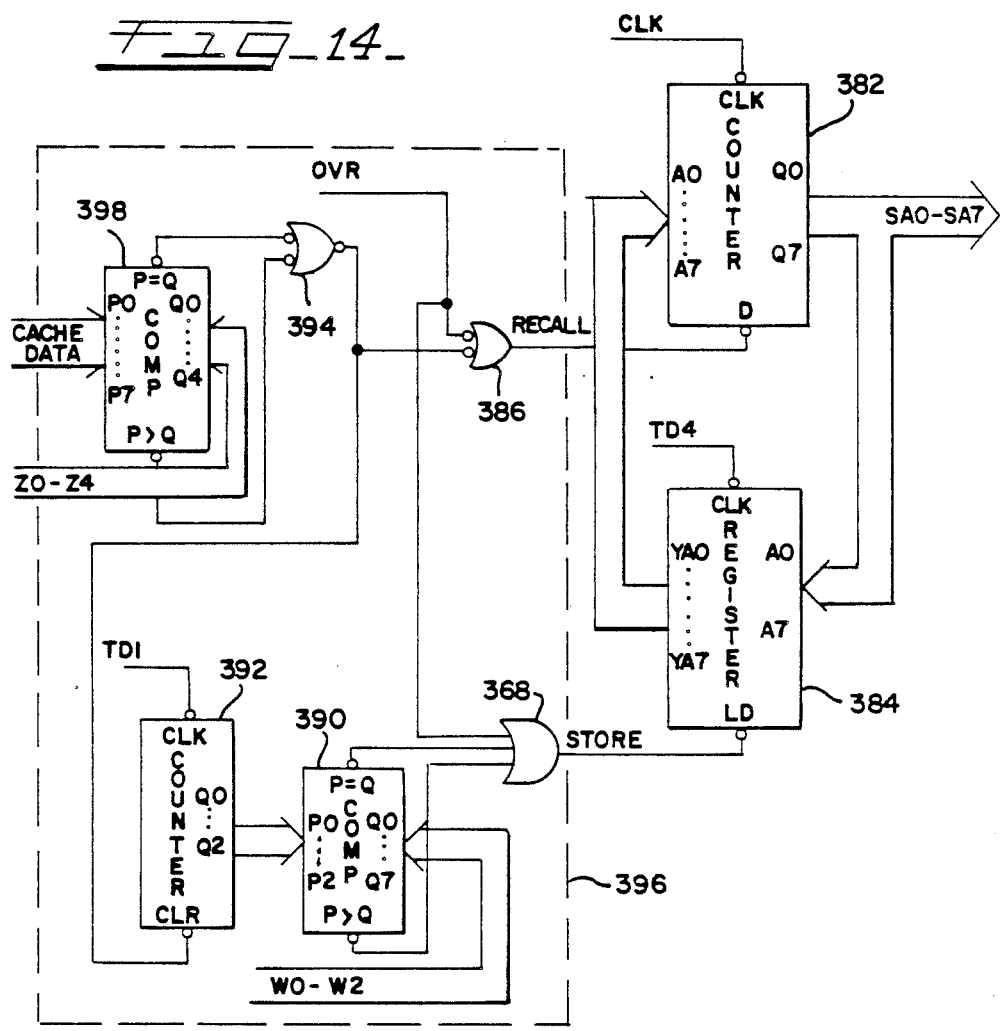
FIG_14_
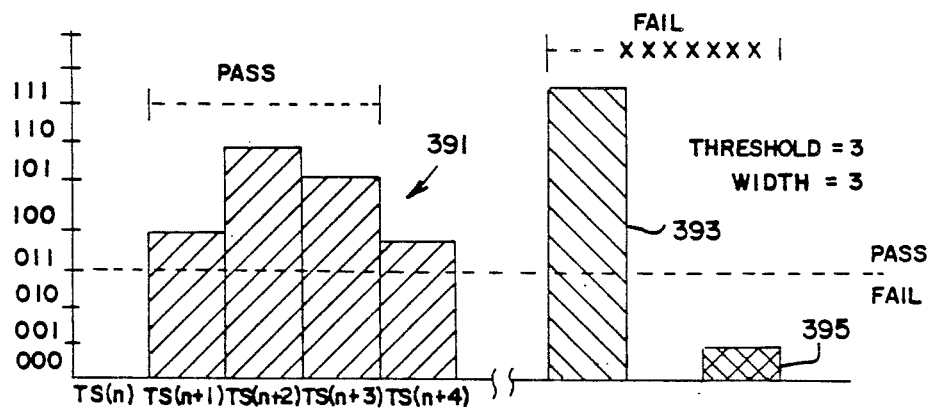
FIG_15_

FIG_17

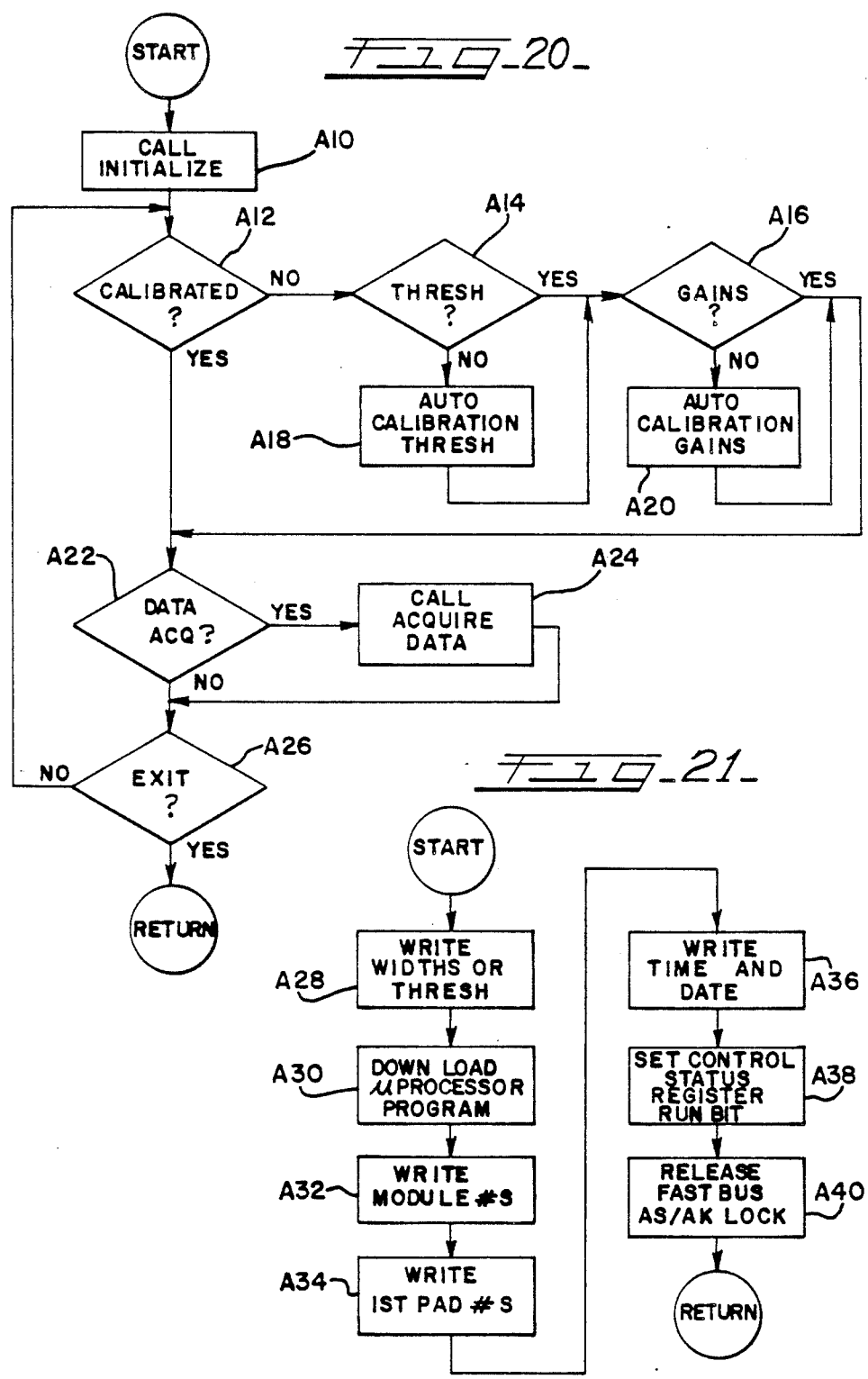

FIG. 24.

```
[- - - - - - - BLOCKLET WC (32) - - - - - - - -]
[- - - -ERR FLGS (16) - - -]  [- - - -DATA TYPE (16) - - -]
[--MOD #(8) -] [- PAD/ (8) --] [- D SIZE (8) -] [- ACC (8) --]
[- - - - PAD #(16) - - - -]   [-WDCNT (8) -] [-NCIST (8) -]
[- - - - 1ST TS (16)- - - -]  [- - - - #AMPS (16) - - - -]
[- - -A0 - - -] [- - -A1 - - -] [- - -A2 - - -] [- - - A3 - - -]
[- - -A4 - - -] [- - -A5 - - -] [- - -A6 - - -] [- - - A7 - - -]
[- - - - 1ST TS (16) - - -]   [- - - - #AMPS(16) - - - -]
[- - -B2 - - -] [- - - B3- - -] [- - -B4 - - -]

[- - -EN - - -] [- - -0 - - -] [- - -0 - -] [- - -0 - - -]
[- - - -PAD # (16) - - - -]   [-WDCNT (8) -] [-NCIST (8) -]
[- - - -1ST TS (16) - - - -]  [- - - -#AMPS (16) - - - -]
[- - -A0 - - -] [- - -A1 - - -] [- -A2 - - -] [- - -A3 - - -]
[- - -A4 - - -] [- - -A5 - - -] [- -A6 - - -] [- - A7 - - -]
[- - - -1ST TS (16) - - - -]  [- - - - #AMPS (16) - - - -]
[- - -B2 - - -] [- - - B3 - - -] [- - -B4 - - -]

[- - -EN - - -] [- - -0 - - -] [- - -0 - - -] [- - -0 - - -]

[- - - - - - - BLOCKLET WC(32) - - - - - - - -]
```

MULTIPLE CHANNEL DATA ACQUISITION SYSTEM

This invention was made with government support under contract number W/7405-ENG-82 by the Department of Energy. The government has certain rights in the invention.

The invention pertains generally to systems for the acquisition of analog data by digital processors and is more particularly directed to such systems which include many high speed data acquisition channels.

The acquisition of analog data by a digital processor is known to include the conversion of an analog signal to a digital form by an analog to digital converter and the input of the converted digital value by the processor over a data bus. The data in digital form, once stored in the processor memory, can be further processed and used for a variety of purposes. Software process control systems based upon the digital conversion and input of sensed analog values are common. Other systems use converted analog data for diagnostic purposes where the values pertain to limits or alarm values. Another of the more advantageous uses for such systems is to collect data relating to a physical event from a multiplicity of the sensors for later analysis.

Systems for the collection of physical data and its digitization and storage are prevalent in scientific systems where vast quantities of data need to be analyzed. Examples of such disciplines where these systems have been used to advantage are physics, astronomy, medicine, chemistry and others. Physical event data acquistion systems generally present the problem of simultaneously digitizing many data channels and efficiently recording the outputs of the channels from which the individual data was taken.

A specific example of an advantageous use of this type of data acquisition system would be in connection with a barrel-shaped electromagnetic calorimeter termed the High-Density Projection Chamber (HPC). The HPC is a fine grained gas sampling calorimeter which uses the principle of time projection to obtain a three-dimensional localization of the energy deposition within it. A series of proportional tubes with U-shaped cross sections are used to amplify the drifted charge and the signals induced on the cathodes of these tubes are collected on a series of pads. The HPC includes 128 readout pads in each of 144 sectors, for a total of 18,432 readout channels.

This calorimeter can be utilized to measure the charge deposited by photons, electrons or other charged particles passing through it. An interesting physical experiment in which charged particles are generated for basic elementary particle research will be performed at the Large Electron Positron Collider, in which two charged particle beams are collided to radiate a number of other smaller charged particles. These emitted particles can then be detected by measuring the energy which they impart to the gases of the barrel calorimeter upon impingement.

However, in order to resolve the energy of single photons and pions, the calorimeter in such instances would have to sample the collected charge 256 times per event over the 90 cm. drift length of each calorimeter sector. This necessitates the collection of digitized charge information for approximately $4.7 \times 10^6$ spatial samples per event. Moreover, the beam crossing rate of the collider requires that digitization of the charge deposited by the particles traversing the calorimeter occur at a frequency of about 15 MHz. Additionally, the charge deposited by individual pions and electrons is relatively small with respect to groups or showers of particles. In order to provide for the sampling of minimum ionizing particles and showers of energies 20 GeV without appreciable saturation, a dynamic range of approximately 800:1 is needed. Therefore, the data acquisition system for such configuration must convert massive amounts of analog information to a digital format in a very short time and over a large dynamic range.

In scientific digitization systems generally, and particularly in the HPC example, there is, much of the time, no relevant data present in many of the data samples. Such digitizations of irrelevant values, or even zero values, take up memory space, and they should be discarded. However, the time constraints of data acquisition for a large number of channels for such systems make such further data processing difficult to accomplish concurrently.

The calibration of data acquisition systems with a large number of data channels further presents difficulty. The gains and zero values for each channel must be set before the digitization system can take an accurate measurement. With a large number of data channels, a manual calibration, or even an automated calibration, can take a significant amount of time.

Another difficulty encountered with the digitization of data from a large number of data channels is the efficient transfer of the data from the acquisition system to a host processor. When massive amounts of data must be moved from one system to another, an efficient communications interface must be used. Otherwise, the acquisition system will spend more time transferring the data than acquiring it. A method of providing efficient data transfer for digital systems is to make the transfer hierarchial where data can be preprocessed before transfer o to the host. Preprocessing can further be accelerated by distributing the processing engines, either serially or in parallel. An efficient communications interface which can be used to connect a host processor with a large number of peripheral devices is the FASTBUS. This bus, which implements IEEE Standard 960-1986 for communications, is a 32-bit wide gateway for data and information between a host and its peripherals. However, this efficient communications interface has not been used in a data acquisition system utilizing a distributed and/or hierarchial preprocessing data transfer technique.

SUMMARY OF THE INVENTION

The invention solves these and other problems of data acquisition systems by providing a system which efficiently digitizes information from a multiplicity of channels and transfers it to a host processor.

In a preferred embodiment, a data acquisition system includes a plurality of data acquisition modules, each adapted to digitize the analog information from a multiplicity of input channels. Each module includes a communications coupler which interfaces with an efficient communications structure for transferring data to a host processor. In the implementation illustrated, the communications coupler connects each module to a FASTBUS backplane which is then interfaced to the host processor.

Each data acquisition module comprises, in addition to the communications coupler, a multiplicity of input digitization circuits including a flash analog to digital converter (FADC), a cache memory for buffering converted information, and means for reading data from said cache circuit onto a submodule bus. The modules are triggered by the host to convert a plurality of sequential time slots (event) into digital samples which are then stored to the cache memories.

Each submodule bus connects the cache memories of a plurality of the input channels to a front end buffer (FEB). Between the FEB and each cache is a zero suppression circuit which filters the data for non-zero values. Because only non-zero values of the data are passed from each cache memory to a FEB, each FEB is divided into two sections where one section stores the data samples and another section stores a digital value corresponding to a time slot at which the data was taken.

The zero suppression circuit, including an address generator, will reject data values based on a threshold values are clocked sequentially out of each cache memory, and the address generator determines whether the data is retained. The selection is made by first clocking data into the FEB at an address generated by the address generator and then retaining the data by incrementing the address or discarding the data by overwriting depending on whether it passes the zero suppression criteria. The zero suppression criteria, in the preferred implementation, threshold and width, are stored in a random access memory which can be read and written to change the parameters stored therein.

In the preferred embodiment, zero suppression is effected if a data sample does not exceed a threshold, which in turn exceeds a pedestal level. The pedestal levels are determined from the zero values of each FADC of the module during a calibration operation. If the data sample is above the threshold, it will be tentatively stored until it is determined if the subsequent two samples are above the threshold thereby passing the width test.

The FEB is further partitioned into individual memory spaces for each associated channel which can hold multiple events for that channel. The partitioning is such that each event begins at a fixed location in the FEB. The lower order byte at this location contains the valid word count for the channel, i.e., the number of data words corresponding to non-zero data values.

Each module further comprises a module bus and a local processor with random access memory which is further connected to the module bus. The module thus exists as a pathway between the FEB of each submodule, the local processor, the module event buffer memory, threshold and width memories, and the communications coupler. The FEB, threshold and width memories, and the module event buffer exist in the memory space of both the local processor and the communications host.

This architecture provides an advantageous method for transferring digitized data to the communications host. In a first method, the communications host can directly access and upload from the FEB of each submodule of each module. Alternatively, the local microprocessor can upload the data o from each submodule to the event buffer and the communications host can upload each event buffer from each module.

This method is advantageous in that the local processors of each module work in parallel to process the data from the FEBs to a single place in each module event buffer where more effective block transfers of data are possible. The local processor also works in series with the zero suppression processor to provide a hierarchial processing technique. In addition, the local processor is capable of reformatting the data from FEB format to a format compatible with the communications host. Moreover, the system with the local processor is capable of additional data compression and analysis or other front end processing on the FEB data. The amount of processing by the local processor is variable to the degree needed for a particular application. Any number of different programs can be provided, since the local processor program is downloaded into the module memory before the beginning of data collection.

According to another feature of the invention, each local processor can auto-calibrate the FADC channels associated with its module. The local processor performs the calibration by executing a calibration program downloaded from the communications host. The calibration program disables the zero suppression and averages a number of data samples taken during a quiescent event time of the device. From these samples, the local processor computes a pedestal level for each channel under its control. Since all the local processors operate in parallel, a calibration which otherwise would be laborious and time consuming can be accomplished with facility.

These and other objects, features, and aspects of the invention will become apparent and more fully described upon reading the following detailed description when taken in conjunction with the attached drawings wherein:

BRIEF DESCRIPTION OF THE DRAWINGS

FIG. 9 is a detailed electrical schematic diagram of the FEB of one submodule illustrated in FIG. 3;

FIG. 10 is a pictorial representation of the allocation of memory space in a FEB of one submodule illustrated in FIG. 3;

FIG. 11 is a pictorial representative of the allocation of memory space for the threshold and width memories of the module illustrated in FIG. 3;

FIG. 12 is a detailed electrical schematic diagram of the control circuitry for the FEB memory and the threshold and width memories of the module illustrated in FIG. 3;

FIG. 13 is an electrical schematic diagram of the threshold and width memories, and address generators which form the zero-suppression circuitry of the module illustrated in FIG. 3;

FIG. 14 is a detailed electrical schematic diagram of one of the address generators illustrated in FIG. 13;

FIG. 15 is a pictorial representation of various data samples being compared by the zero suppression circuitry;

FIG. 20 is a system flow chart of the executive program for controlling the data acquisition system illustrated in FIG. 1;

FIG. 21 is a detailed flow chart of the initialization routine illustrated in FIG. 20;

FIG. 24 is a pictorial representation of a reformatted data blocklet sent to the host by the local processor.

DETAILED DESCRIPTION OF THE PREFERRED EMBODIMENT

Figure 1:
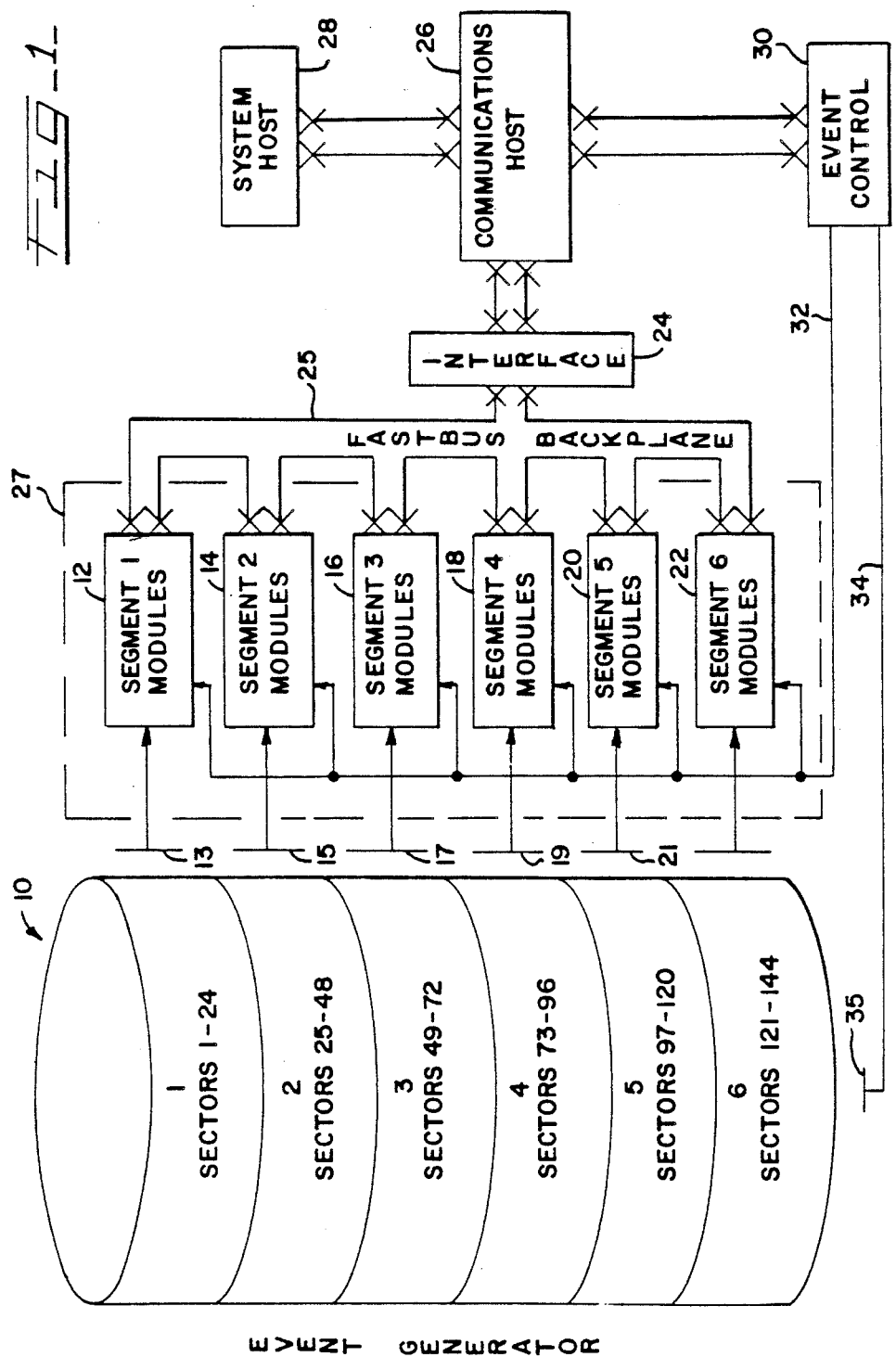
FIG. 1 is a system block diagram of an apparatus for measuring a physical event incorporating a data acquisition system constructed in accordance with the invention.

FIG. 1 illustrates a system for the acquisition of digital data related to a particular physical event which includes a data acquisition system constructed in accordance with the invention. The system includes an event generator 10 which is a device equipped with a multiplicity of sensors to take measurements of a physical phenomena. As an example, the specification will use as an event generator the barrel calorimeter described for the HPC. While data acquisition for this particular phenomena requires a multiplicity of data sensors, there are many other event generators which are equivalent in that they require many sensors operating simultaneously to record an event properly.

In the system illustrated in FIG. 1, the event generator 10 comprises six segments 1-6, each having 24 sectors, for a total of 144 sectors. Each sector 1-144 has multiple data sensors shown schematically at 13, 15, 17, 19, 21 and 23 which connect to groups of segment modules 12, 14, 16, 18, 20 and 22, respectively. The segment modules contain a plurality of modules for each sector and segment, such that sufficient circuitry is L provided to digitize all the analog signals detected by the sensors. The segment modules 12-22 connect to a communications bus 25 which transfers the recorded digital data from the sensing of an event to a communications host 26 through an interface 24. In the preferred embodiment, this communications bus 25 is a master/slave driven communications interface termed a FASTBUS. The segment modules 12-22 are identical such that they interconnect easily to the FASTBUS backplane 25.

The communications host 26 is under a control of a system host 28 to input and process the data which is measured by the data acquisition system 27. The system host 28 communicates to the data acquisition system 27 via the communications host 26 and the interface 24. An event control 30 further communicates to the system host 28 through communications host 26. The event control 30 provides timing and clock lines 32 to the segment modules 12-22. The event control 30 further has sensors 35 which are read on lines 34 which do not take data but are for event control and processing of the data acquired during an event.

In operation, the sensors 35 attached to sensor lines 34 detect particular parameters and cues concerning the physical status of the event generator 10 and cause the event control 30 to issue a trigger to begin the data acquisition by data acquisition system 25. The data acquisition system 25 digitizes the inputs from the multiplicity of sensors 13-23 and then transfers this acquired data either in full or compressed form via the FASTBUS backplane 25 to the communications host 26 and eventually the system host 28.

If, durinq the digitization, the event control 30 determines that the detected event is not interesting, then it can reset the data acquisition system 27. Thus, the system will only digitize during events (triggers) and only for the amount of time necessary to determine the event may have significant data. If there is a determination that the data is interesting then it will be stored and further processed. The segment modules 12-22 will communicate to the communications host 26 whether significant data is stored or not.

Figure 2:
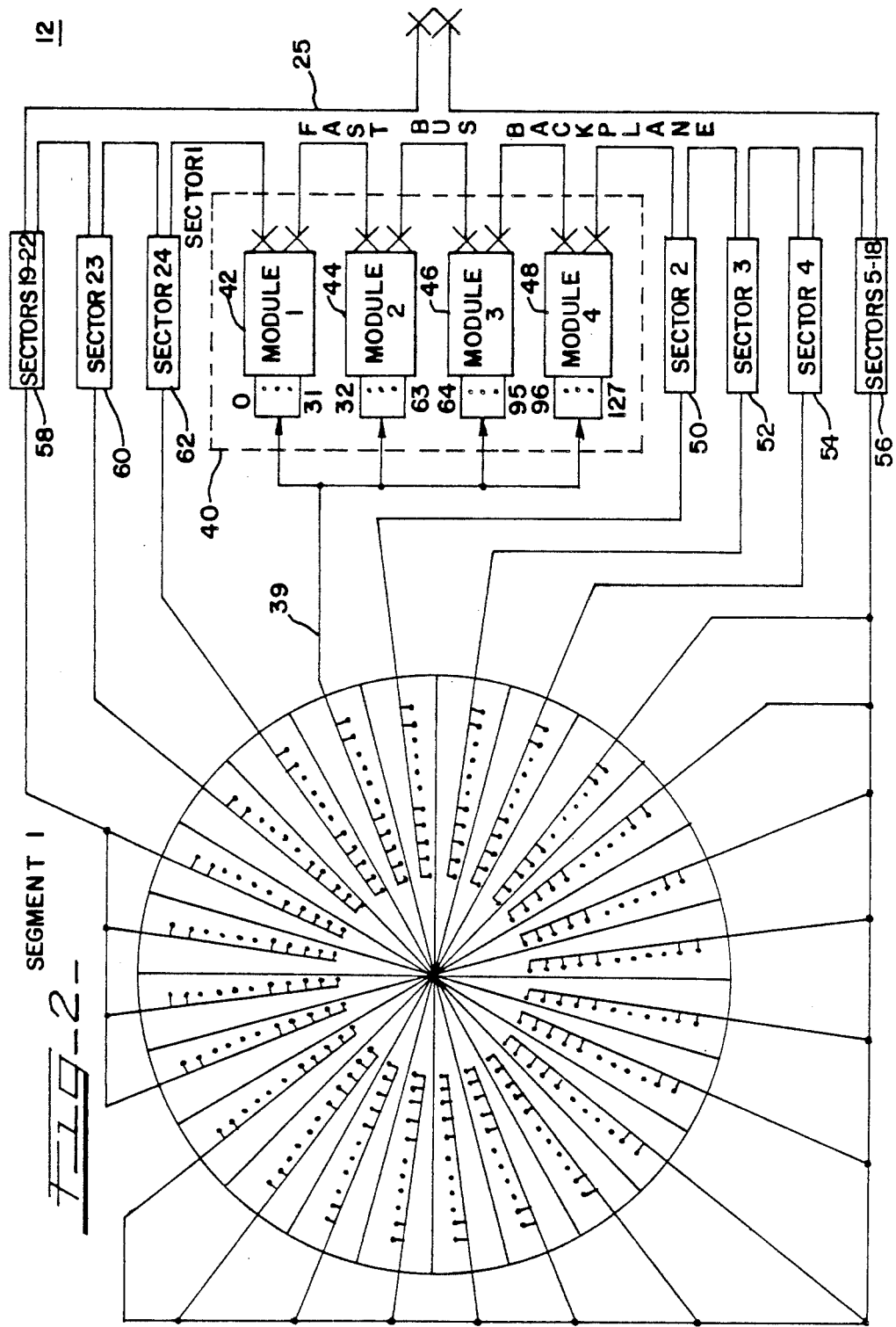
FIG. 2 is a detailed block diagram of one of the segments of the event generator illustrated in FIG. 1 showing the module groupings associated therewith.

A more expanded view of the modules which comprise one segment group, for example segment group 12, is shown in FIG. 2. Each segment module group contains 24 sector groups of which sector 1 at 40 is an example. Sectors 2-24 are represented as sector modules 50-62, respectively, and contain the same configuration and number of modules that sector 1 at 40 contains. The sector 1 group comprises four modules 42, 44, 46 and 48, each of which are coupled to the FASTBUS backplane 25 and to a plurality of sensors 39 for the respective sector of a segment. In a preferred embodiment, each module, for example 42, digitizes the inputs from thirty-two channels 0-31. The total system, thus, instruments 128 channels for each of the 144 sector groups for a total of 18,432 channels. Because of the particular event generator 10 described, 256 time slots are measured per event. Total digitized information for the system of approximately $4.7 \times 10^6$ data words are thereby recorded per event. Such massive data acquisition in a relatively short period of time requires the efficient and extremely fast data acquisition system which is provided by the invention.

Figure 3:
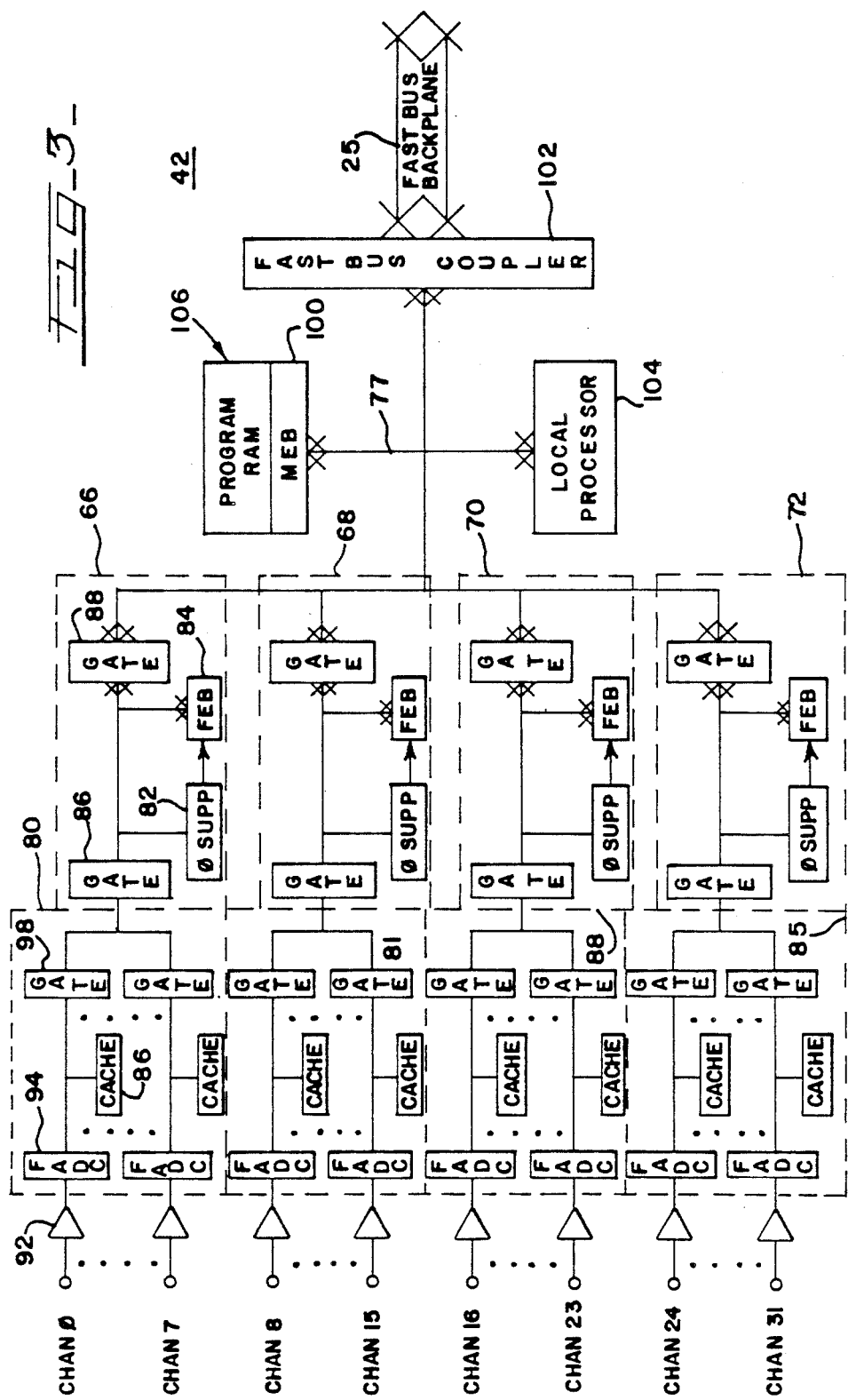
FIG. 3 is a detailed functional diagram of one of the data acquisition modules of the data acquisition system illustrated in FIGS. 1 and 2.

With respect now to FIG. 3, there is shown a detailed block diagram of one module, for example the one designated 42 in FIG.2, of the multi-channel data acquisition system. The module 42 comprises a plurality of submodules 66, 68, 70, and 72 connected to a module bus 77. Each of the submodules, for example 66, includes a plurality of input channel circuits comprising an input channel group (for example, channel group 80) a zero suppression circuit 82, a FEB (FEB) 84, and gates 86, 88. Each of the input channel circuits of a channel group 80 includes an input amplifier 92, a flash analog to digital converter (FADC) 94, a cache memory 96 and a gate 98.

The module further includes a local processor 104 connected to the module bus 77 and associated module memory 106 similarly connected to the module 102 bus. Completing the elements of the module 42 is a communications coupler 102 coupling the module bus 77 to the FASTBUS backplane 25.

In operation, the analog signal from the respective event sensor is input to the amplifier 92, differentially amplified, and then converted to a digital value by FADC 24 at a specified clock rate. The digital values are temporarily stored in the cache memory 96 of the input channel circuit until an entire event is recorded (256 samples). When the loading cycle is complete, the data is transferred (dumped) to the FEB 84 from each cache memory of the eight channels in the group. The unloading of the cache memories for a group 80 is sequential, with the first finishing before the next starts. Gate 86 which is closed for the load cycle is open during the dump cycle and is connected to the open gate of group 80 in sequence. The data flows first to the zero suppression circuit 82 which causes data values below a threshold and less than a predetermined width to be discarded.

After data from the cache memories of the associated channel groups have been transferred to the FEBs of the submodules 66, 68, 70 and 72, one of two operations may take place to upload the data to the communications host 26. The first operation includes the direct addressing of the FEBs by the communications host 26 to take the information directly. The communications host 26 accomplishes the transfer by enabling gate 88 of a submodule, and by then addressing the FEB 84 directly.

Alternatively, and more advantageously, the local processor 104 controls the transfer the information stored in each FEB for each submodule into the section of module memory 106 designated as the module event buffer 100. The communications host 26 can then perform a block transfer of all the data for a module by addressing the module event buffer 100. The local processor 104 is halted during the load and dump cycles of the submodules so that it Will not interfere with the sensitive analog sensors of the design.

In the preferred implementation shown in the drawing, the module 42 is capable of digitizing 32 channels of information, CHAN0-31. These 32 channels are partitioned into groups of 8 input channel circuits, where each group shares a zero suppression circuit and a FEB. While each group shares a zero suppression circuit, there is provision for each input channel to have its own suppression criteria. A group of 8 input channels, a zero suppression circuit and a FEB form one of the four submodules. The four submodules, the module event memory 106, the local processor 104, the module bus 77 and the communications coupler 102, comprise the module 42.

Figure 4:
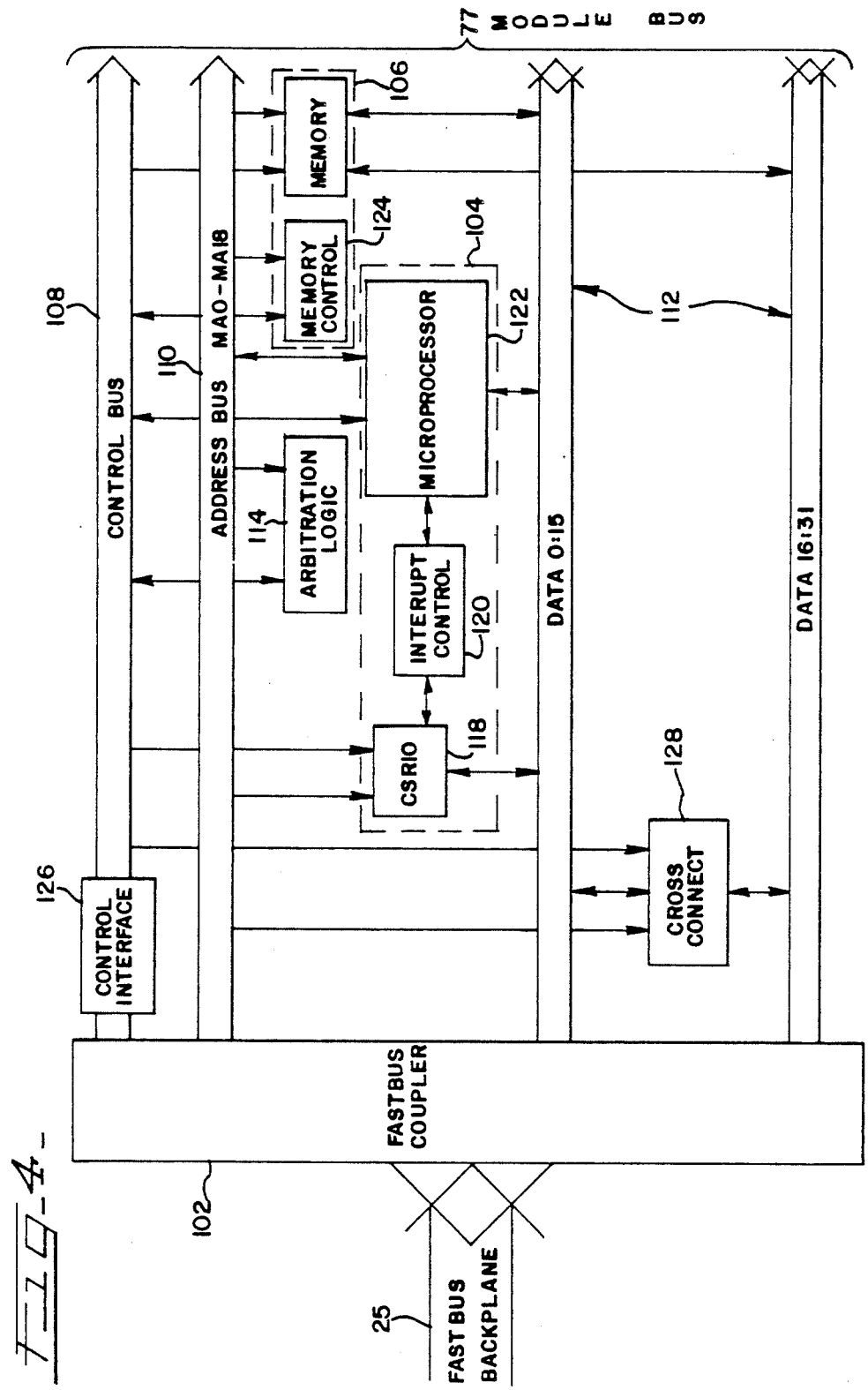
FIG. 4 is a detailed hardware block diagram of the module bus, local processor, the FASTBUS coupler, and their interconnections.

A more detailed block diagram of the local processor 104 and the module bus 77 are shown to advantage in FIG. 4. The module bus 77 comprises a control bus 108, a 19-bit wide address bus 110, and a 32-bit wide bidirectional data bus having data lines D0–D15 and data lines D16–D31 at 112. The module bus 77 is common to the local processor 104, the communications coupler 102 and the module memory 106 thereby allowing access of the module memory by either the local processor or the communications host through the coupler 102.

The system further includes arbitration logic 114 to determine which processor, the local processor 104 or host processor, will control the bus 77, for how long and by what protocol. A control interface 56 also generates control signals which assist the local processor and the communications coupler to handle the module bus 77. In addition, the control interface provides control signals to a cross-connect circuit 60 to allow the data on line D0–D15 of the data bus to be applied to the opposite data lines D15–D31, and vice versa. A control status register CS10 at 118 is selected by control lines from the address bus 110 to select the module. Once selected, the control status register CSR10 inputs data from the communications coupler via the data bus 112. These data are the control commands of the communications host for the local processor 104. The commands of the control status register 118 are translated by an interrupt control 120 into interrupts which command a microprocessor 122 to transfer command processing to selected control routines. The memory control 124 is accessible by both the local processor 104 and the communications host 26 to either read or write data into the module memory 106.

Because the communications coupler 102 uses a 32-bit data bus and the microprocessor 122 uses a 16-bit data bus, it is necessary to reconfigure the data bus 112 dynamically from 32 to 16 bits. This is done by a cross-connect circuit 128 which connects data lines D16–D31 to their corresponding data lines D0–D15 when the microprocessor 122 tries to access data that would be in the upper 16 bits in a 32-bit word. The control signals provided by the communications coupler 102 are not the same as those recognized by the microprocessor 122 and module memory 106. Therefore, control interface circuitry 126 is provided to transform the signals from the FASTBUS coupler 102 into compatible signals.

The system has a series of triggers or levels which causes data from individual events to be accepted for further processing or discarded as not of current interest. These trigger levels provide a prefilter or preprocessor for the massive amounts of data which the system is able to digitize. The system is presently configured to be capable of digitizing 18,432 sensor output channels, each having 256 samples, every 22 microseconds. If all of this data were stored even for a short time, the processing capabilities and storage of the host would be overextended. Because, in many physical experiments, much of the data is not interesting, as it does not include the event being searched for, extraneous values should be discarded at the earliest possible time in the system processing cycle so as not to tie up higher level system assets.

Therefore, at a first level, the system is triggered to begin taking data for an event. In the present example, this trigger is coincident with the beam crossing of two particle beams which produces charges in the calorimeter. No trigger is applied to the system unless there is a good possibility that significant data will result, i.e., a prescreened event occurs. If during the digitization of an event or the buffering of the data in the FEBs, the event control 30 decides that the event data should not be further processed, then a second level trigger will reset the system. The transfer of the digitized data will not be made, but the system will instead cycle back to an idle mode and be immediately ready to digitize another event upon synchronization with the next beam crossing. With this priority triggering system, only a few events out of the many possible will be digitized by the first level trigger, for example, 1 event in 100 possible events. Still fewer, those which after digitization were noted to be of interest will be stored to the FEBs, for example, 1 event in 100 of those digitized. Of the events which are stored in the FEBs, the data therein has also been effectively compacted by zero suppression.

A third level of triggering is provided by the local processor 104. The local processor by means of various computations, or other system functions, can preprocess the data stored in the module event buffer to determine if it contains information which may require further processing. In this case the module will signal the communications host it has data ready. If the information the data contains has been totally zero suppressed or otherwise discounted, the module will not signal the host. Further, during the transfer of the data from the FEBs to the module event buffer, the data can be further compressed by the clustering program.

The hierarchial triggering procedure produces a system whereby only highly compressed data packets which are known to contain relevant information are transferred to the host for final analysis. The preprocessing or data screening occurs at every step of the data flow to eliminate irrelevant data and to compact that data which is relevant. Further, the preprocessing steps become more intelligent and more complex as more is known about the entire overall event and data samples.

Figure 5:
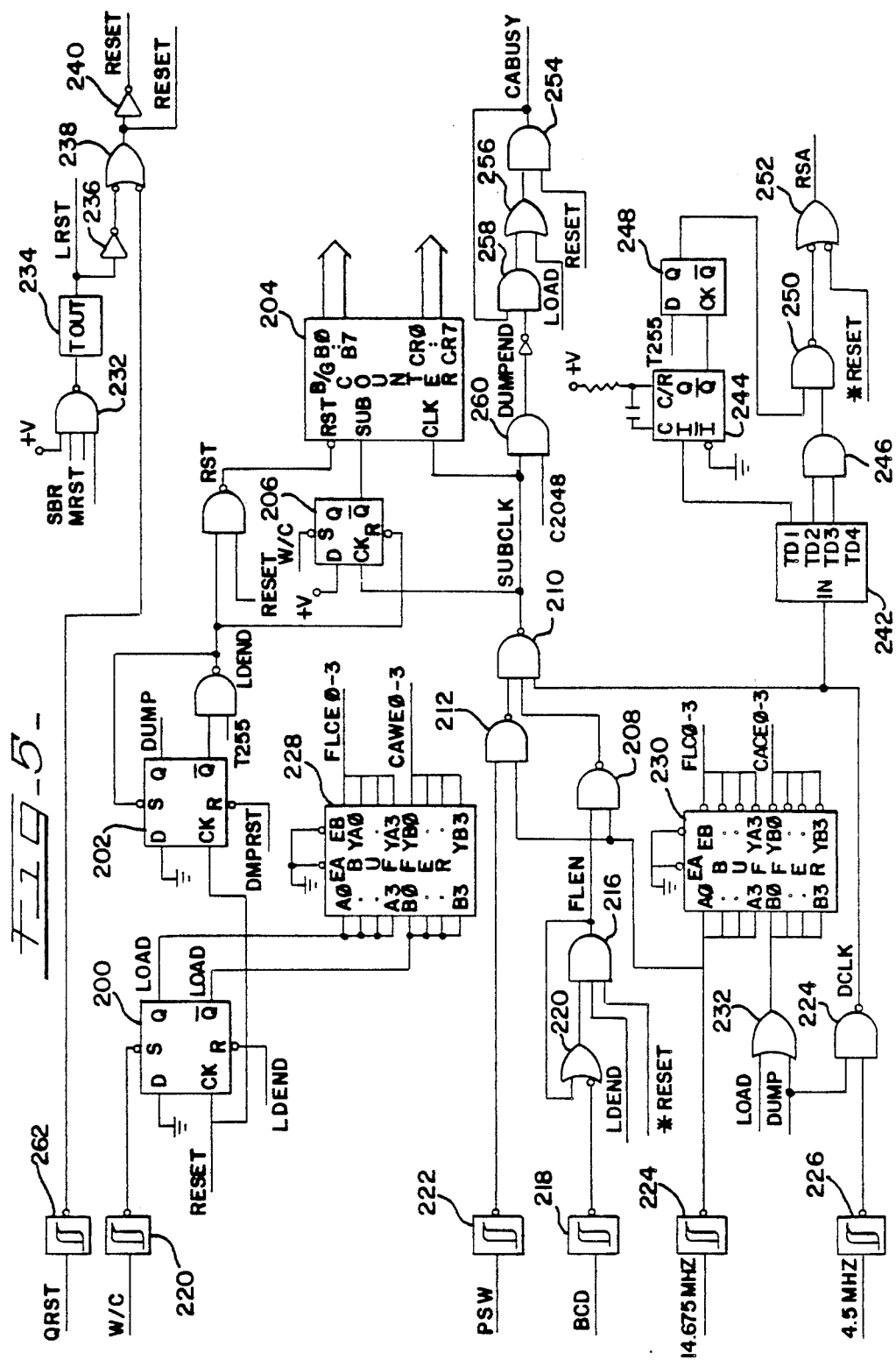
FIG. 5 is a detailed block diagram of the timing and control circuitry associated with the module illustrated in FIG. 3.

FIG. 5 illustrates the detailed circuitry of the timing control of the data acquisition system illustrated in FIGS. 1–4. In general, there are a number of basic system timing signals which are operated on logically by the circuitry to produce timing and enabling signals which convert the channel voltages to digital numbers, store those digital numbers in the cache memories, unload the cache memories to the FEBs, and provide system control of this process.

The analog to digital conversion process is controlled overall by two R-S bistables 200 to 202 and a binary/Grey counter 204. The bistable 200 is set by a signal W/C after being shaped in inverter 202. The W/C signal is the warning/clear signal which alerts the system that an event which is to be sampled is about to begin. This signal, therefore, sets the bistable 202 to produce the signal LOAD at the Q output of the device. When the load cycle for the cache memories is complete, the bistable 200 will be reset by the signal load end, LDEND. The time between the warning/clear signal W/C and the load end signal, LDEND, is 20 microseconds. After the load cycle the bistable 202 is set to generate at its Q output a signal DUMP which unloads the caches into the FEBs. The bistable 202 is set by the signal LDEND which indicates the end of the load cycle and the beginning of the dump cycle. When the dump cycle is complete, the bistable 202 is reset by the signal DMPRST which is applied to its reset input, R. The dump cycle is 455 microseconds in duration. Both bistable 200 and 202 are cleared by the RESET signal applied to their respective clock inputs CK. The signal RESET will produce a clearing of both bistables such that a new warning/clear signal can restart the load/dump cycle immediately. This is a second level trigger which rejects the data presently being loaded into the system.

The Counter 204 is a binary/Grey counter Which has binary outputs B0-B7 and a Grey code outputs, CA0-CA7. The counter 204 has the address outputs CA0-CA7 connected to the address lines of the cache memories so that all receive a Grey code address output which only changes one bit for each address increment. In this manner, the cache memories may be loaded very quickly from the FADCs without address mistakes due to noise and settling times. Binary addresses from outputs B0-B7 are used to store the time slots for particular data values that are stored in the cache memories. The cache memories are loaded in parallel and thus the address output CA0-CA7 are stepped through once from 0-255. Thereafter, the cache memories are unloaded into the FEB and address outputs B0-B7 are incremented from 0-255 eight times.

The input SUB of the counter is connected to the logical *Q output of a D-type bistable 206. This output adjusts the cache memory address to align with the FEB address. The clock input CLK of the counter receives a signal SUBCLK which changes depending upon whether the counter is providing addresses for the load cycle or the dump cycle. During the load cycle, the counter 204 is counted at a fast rate of 14.675 MHz by a clock which input through NAND gate 208 and 210. NAND gate 210 is configured as a negative true input OR gate which serves to pass one of three signals from NAND gates 208, 212, or 224. The high speed or fast clock in enabled to the counter 204 via NAND gate 208 provided it is coincident with a flash enable signal, FLEN. The flash enable signal is output from NAND gate 216 which passes the beam crossing signal, BCO, from shaping inverter 218 provided the load cycle has not ended, as determined by the LDEND signal, and the system is not reset, as determined by the *RESET signal. OR gate 220 causes the FLEN signal to become latched on the rising edge of the BCO signal until either the load end signal or *reset signal occur. Prior to the BCO signal however, a pre-sample window signal PSW can enable the 14.675 MHz clock through NAND gate 212. The PSW signal is applied through shaping inverter 222.

During the dump cycle, a slower clock, a 4.5 MHz signal, is input through a shaping inverter 226. The signal is gated to the NAND gate 210 by applying the DUMP signal to one input of NAND gate 224 whose other input is the 4.5 MHz signal. When the load cycle is completed, the DUMP signal makes a low to high transition and NAND gate 224 is enabled to allow clock pulses to flow through NAND gate 210 and clock the counter at the slower rate.

The LOAD and the DUMP signals are further used for general enabling signals for the input channel circuitry of the data acquisition system. A buffer 228 and a buffer 230 generate the enabling signals allowing the flash A/D converters to operate and the cache memories of the input channel circuitry to be read and written. Buffer 228 is enabled by grounding its inputs EA and EB. Therefore, the signals applied to its A0-A3 inputs appear at its YA0-YA3 outputs, and similarly, the inputs which appear at the B0-B3 inputs will appear at its YB0-YB3 outputs. The LOAD signal is applied in parallel to inputs A0-A3 to become four flash clock enable signals, FLCE 0-3 at the outputs of the buffer 228. Similarly, the inverted load signal *LOAD is applied to the B0-B3 inputs of the buffer. These signals become the cache write enable signals, CAWE0-3. The FADCs are supplied with the 14.675 MHz signal by buffer 230. The clock signal is applied to the A0-A3 inputs and is fanned out to become the flash clock signals, FLC0-3 from the YA0-YA3 outputs, respectively.

The cache chip enable signals CACE0-3 from buffer 230 are fan outs of the CACHE signal from OR gate 232 applied to the B0-B3 inputs of the buffer. The CACHE signal is a logical combination of the LOAD signal or the DUMP signal, thus, asserting the signal during both the load and dump cycle.

The circuitry which provides the reset includes negative true input OR gate 238. The reset provided by the system can be one of two types. A long reset LRST which is applied to OR gate 238 via inverter 236 or the quick reset QRST applied by the system through shaping inverter 242. The output of OR gate 238 can either be applied directly to reset circuitry or inverted by inverter 240 before applying the reset. The long reset LRST is generated by a timer 234 which is triggered by the output of negative time input OR gate 232. A number of signals are provided to produce alternative triggers for the long reset LRST. The first is a power up reset where a voltage $+V$ is attached to capacitor 244 through resister 246. When power is applied to the circuit the input of gate 232 goes low triggering the timer 234. Similarly a system reset SBR applied by the module circuitry produces a similar result. A manual reset is provided by attaching a push button to a grounding line to generate the signal MRST to gate 232.

The cache busy signal CABUSY is directed to other circuitry in the module and causes the local processor 104 to halt and denies the host access to the module memory until the cache busy is done. This produces a noise free environment for converting and storing the event data without interference which could cause data errors. The cache busy signal, CABUSY, is provided by the output of NAND gate 254 which initiates the signal when the LOAD signal is asserted through OR gate 256 providing the reset signal *RESET is not asserted. The load signal will cause the CABUSY signal to be asserted by latching itself through NAND gate 258 until the dump end signal is present. The CABUSY signal will be asserted from the beginning of the LOAD signal until the end of the DUMP signal.

Another signal from the timing circuitry in FIG. 5 is signal RSA which is generated to reset the FEB circuitry as either an output from NAND gate 250 or the *RESET signal applied to one input of OR gate 252. The RSA signal output from NAND gate 250 is the coincidence of the signals from the output of NAND gate 246 and the Q output of D-type bistable 248. The D-type bistable has its D input tied to the signal line T255 and its clock input to a monostable 244 which is triggered from the TD1 output of counter 242. NAND gate 246 detects the coincidence of the output signals TD2 and TD3 of counter 242. The counter 242 is clocked by the dump clock signal DCLK applied to its input IN. In operation, the circuitry acts to reset the FEBs after eight dump cycles to produce the storage of different events from the eight cache memories which are associated with each FEB.

Figure 6:
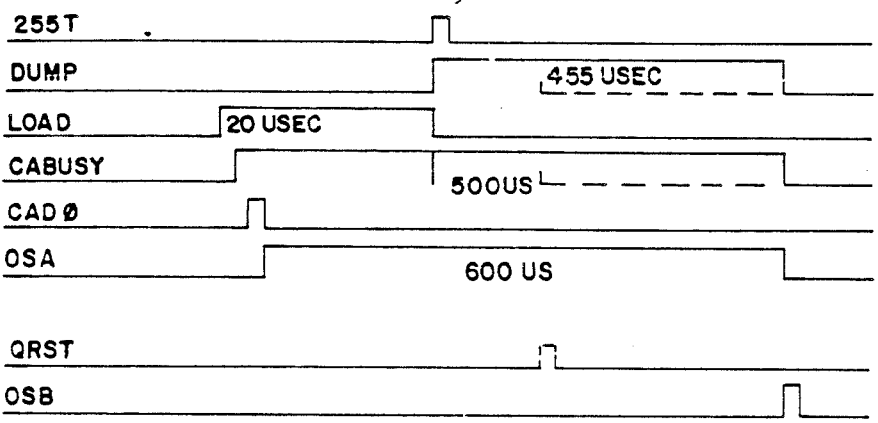
FIG. 6 is a pictorial representation of various timing and clock signals generated by the circuitry illustrated in FIG. 5.

FIG. 6 illustrates the timing waveforms for the front end of the data acquisition system illustrated in FIG. 1. In general, the beam crossing signal BCO or first level trigger begins a 20 microsecond load cycle. During the 20 microsecond load cycle, the flash clock causes the cache buffers to be filled with 256 data samples. Because the sampling is done in parallel the buffers of all modules are filled simultaneously. During this time the cache busy signal, CABUSY, is asserted at a high logic level such that the local processor 104 is halted and no memory transfers from the host will take place over the module bus. At the end of the 256 clock cycles (T255) which are fill the cache memories, the dump cycle which is 455 microseconds in length begins. This unloads the cache memories for each module into one of the multiplexed FEBs. The cache busy signal CABUSY is continually asserted during this time period. Any time after the load cycle has been completed to fill the cache buffers, the quick reset signal QRST will halt the dump cycle and cause the system to reset so that another load cycle can be triggered immediately.

Figure 6A:
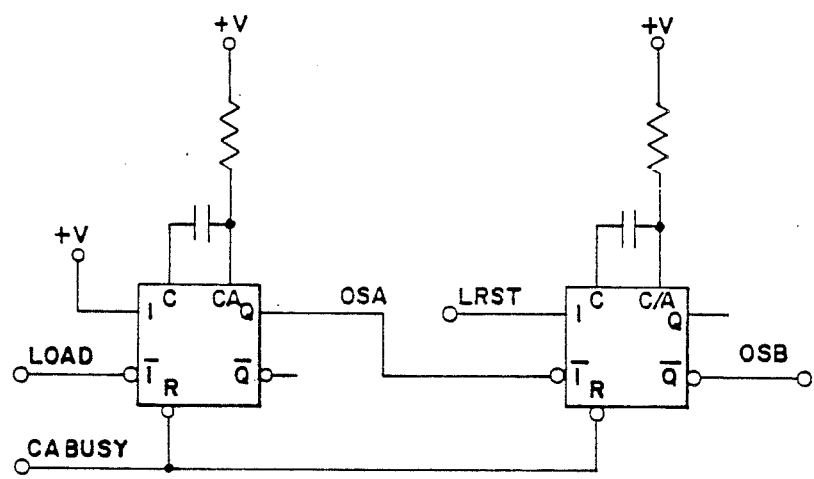
FIG. 6A is a schematic of the watch dog driver of the system.

After the first address CAD0, a signal OSA from the watch dog (see FIG. 6A) timer will be set high and will cause a reset 600 microseconds later if not cleared by the high to low transition of the load signal. This insures that the watch dog timer times the load cycle so that the system will not become locked in a load cycle with the local processor and the host locked out of communications with the module. At the end of the cache busy signal, when the data has been transferred to the FEBs, a pulse OSB which cancels the busy signal for the system is generated.

Figure 7:
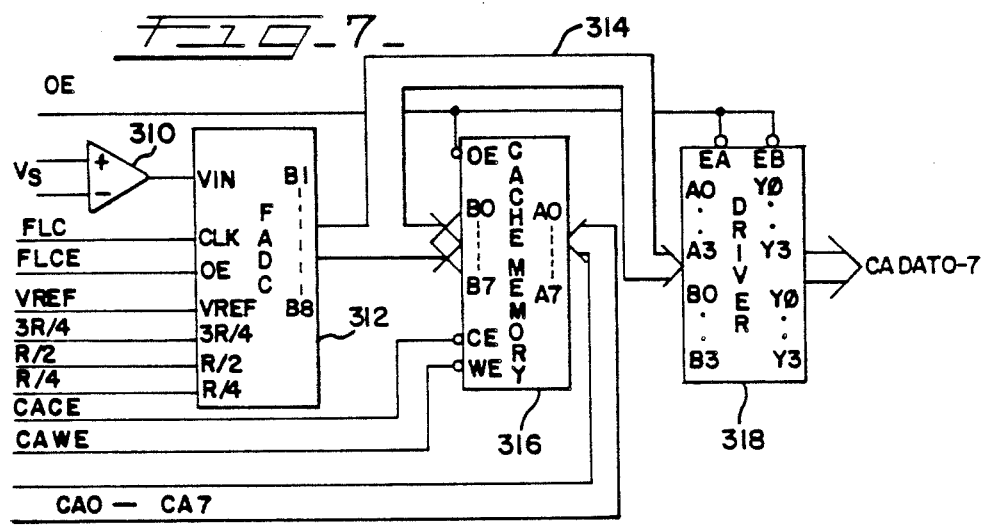
FIG. 7 is a detailed electrical schematic of the input channel circuitry illustrated in FIG. 3.

FIG. 7 illustrates the detailed circuitry which comprises one of the input channel circuits of the system. The module 42 being described will have 32 such circuits. The sensor output voltage Vs is applied to the inverting and noninverting inputs of a high gain differential amplifier 310. The output of the differential amplifier 310 is connected directly to the conversion input, Vin of a FADC 312. The FADC 312 further has inputs from the flash clock signal FLC and the flash clock enable signal FLCE. These signals are applied to the clock input CLK and output enable input OE. A sample of the analog voltage Vs is taken every flash clock period, converted to a digital value and is present at the outputs B1-B8 during the enable signal.

The FADC 312 further has four reference voltage inputs for determining the conversion scale and gain of the device. A reference voltage Vref and quarter increments thereof, 3R/4, R/2, and R/4 are provided to the FADC at similarly named inputs. The digital outputs B1-B8 of the FADC 312 are coupled by a data bus 314 to a cache memory 316. The data bus 314 connects the inputs/outputs B0-B7 of the cache memory 316 to the outputs B1-B8 of FADC 312 or to the inputs A0-A3, B0-B3 of a dual four-bit driver 318. The cache memory 316 is a 256 X 8-bit random access memory with a response time of 35 nanoseconds and is controlled by three signal lines. The first signal line which allows the memory to be read from is the negated chip enable input *CE. This in combination with the output enable input OE causes the cache memory 316 to output a data word onto the data bus 314 depending upon the address at its inputs A0-A7. The signal that enables the output of cache memory 316 is OE that is further applied to the enabling inputs EA and EB of the driver 318. For writing data into the cache memory 316, a write enable input *WE receives the signal CAWE.

In operation, the input channel circuitry operates by converting the voltage Vs into a digital number under the control flash clock signal FLC. Once the digital number has been determined, the flash clock enable signal FLCE places that digital value on the data bus 314. In a normal operation, when the data is placed on the data bus 314, the chip enable signal CACE and write enable signal CAWE are asserted at a low logic level to enable that data to be written into the cache memory 316. The location at which the data is written is determined by the address lines BCA0-CA7 which is Grey code. The cache memory S16 is sequentially loaded with the digital values for a particular channel. The values are 256, 8-bit data words corresponding to the time slots at which the sensor signal is sampled.

When the cache memory 316 is ready to transfer its contents to the FEB, the output enable signal OE is asserted low and the address of the data to be read is provided to the address inputs A0–A7. This causes the cache memory 316 to read out the data value onto the data bus 314 and output it to the particular FEB through driver 318 which is also enabled by the output enable signal OE.

Figure 8:
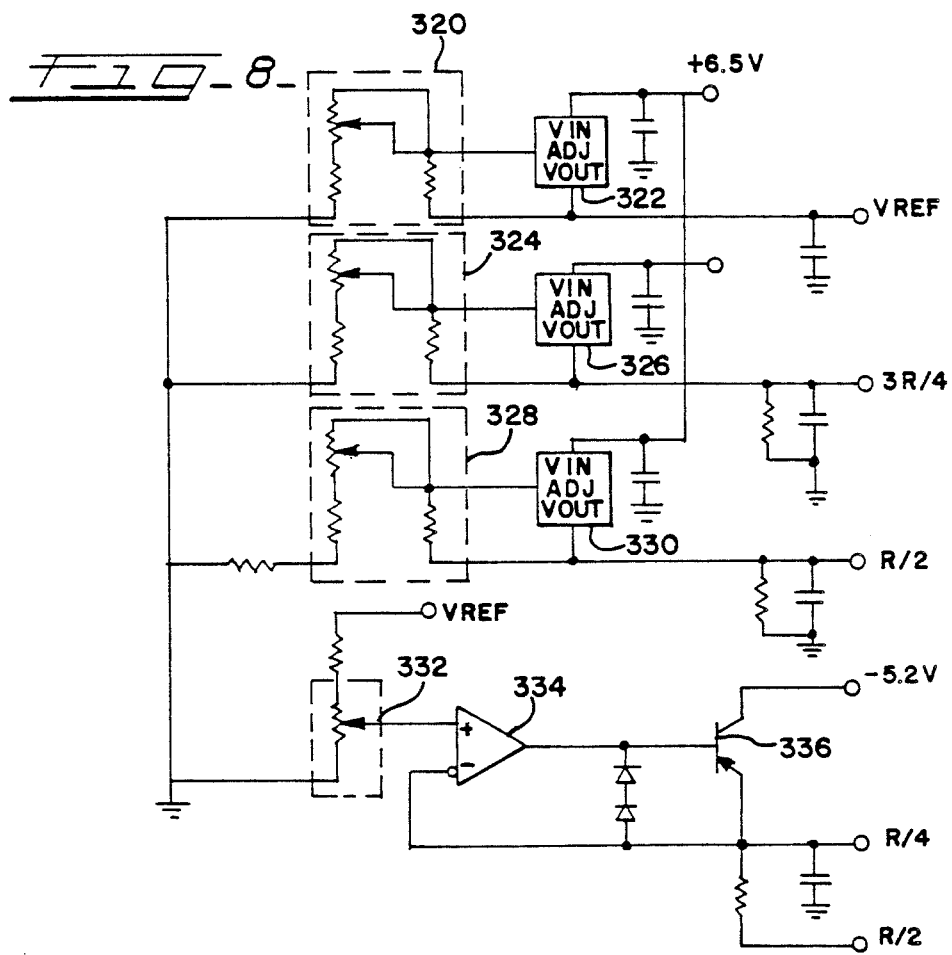
FIG. 8 is a detailed electrical schematic diagram of the circuitry to generate the plurality of reference voltages which are used by the FADC illustrated in FIG. 7.

FIG. 8 illustrates the circuit which generates the reference voltages Vref, 3R/4, R/2, and R/4. The reference Voltages Vref, 3R/4, and R/2 are generated by regulators 332, 326, and 330, respectively from the 6.5 V input. Bias circuits 320, 324, and 328 respectively are adjusted to provide the correct voltage ratios for the regulators. The reference voltage R/4 which provides a bilinear response for the FADC 312 is generated from the PNP transistor 336 in response to the output of operational amplifier 334.

A detailed schematic for one of the FEBs and its associated control circuitry will now be more fully discussed with respect to FIGS. 9, 10, 11, 12 and 13. The FEB for one of the submodules comprises the two 8 X 8K random access memories 344 and 352 (FIG. 9). Each memory is segmented into eight 1K areas to be able to store up to four events for each cache memories to which it is connected. Its division is illustrated in FIG. 10. An event which is 256 samples in length requires the address lines A0–A7 to specify the location in the memory where the sample will be stored. Address lines A8–A9 then define which event of the channel is being stored and address lines A10–A12 define which channel is being accessed. The RAMs 344 and 352 are mirror images in that they are segmented in the same manner and store associated data. The RAM 344 stores the values of the data samples which are converted and RAM 352 stores at the same address the time slot of that data.

Data enters the RAM 344 from a cache data bus 338 through a dual 4-bit driver 340 when its inputs A0–A3,-B0–B3 and its outputs YA0–YA3,YB0–YB3 are enabled by a low logic level signal ENA. The 8-bit data sample is applied to the data inputs D0–D7 of the memory 344 and is stored at the location of the address asserted on the address lines A0–A12 at the particular time. The other control signals which must be asserted at the same time to write a data word into the memory 344 are a low logic level to the chip enable input *CEI and a low logic level to the write enable input *WE. The cache data input to the driver 340 is from one of the eight channels assigned to the FEB. The data sample is chosen by multiplexing the respective output drivers of the cache memories. The RAM 352 similarly inputs a data sample through a dual 4-bit driver 356 when the inputs A0–A3,B0–B3 and the outputs YA0–YA3,YB-0–YB3 of the driver are enabled by the low logic level signal ENA. The data sample which is applied to the data inputs D0–D7 of the memory 352 is the address of the cache which is presently transferring data and is thus the time slot of the data being stored contemporaneously in RAM 344. The address at which the time slot is stored corresponds to the address at which the data is being stored in the other memory 344. The write control signals which are applied to the memory 344 are also used to write the data into memory 352 by being asserted at the chip enable input *CEI and write enable input *WE, respectively.

The address at which the data is stored in memory 344 and the time slot is stored in memory 52 is determined by an address generator which presents the address to the inputs of a dual 4-bit driver 348. The address from the address generator is presented to an address bus 366 connected to the A0–A7 inputs of both RAMs 344 and 352. The address is transferred to the address inputs on the memories when the inputs A0–A3, B0–B3 and the outputs YA0–YA3, YE0–YB3 are enabled by the low logic level signal ENA.

The address generator controls the storage of the data words into RAM 344 and the storage of time slots into RAM 352 by discarding certain data words (zero suppression). If the data is below a threshold value, the address generator will not increment the address for RAM 344 to the next address, and thus, the next data sample will overwrite the previous data sample causing it to be discarded. If the width requirement for the data sample is not passed, then the address generator will be reset to overwrite those particular samples. While the address generator processes and changes the address according to the threshold and width values, the address input to the driver 356 continuously increments sequentially through the time slots. Therefore, the particular time slot at which a data sample was taken is not lost.

In general, the addresses to FEB are changed synchronously with the output of the data from each data cache until all of the eight data caches with which the FEB is associated are unloaded. At the end of each channel transfer, the number of words that are stored in the FEB out of the 256 possible values are loaded into address zero of that particular event space. The particular event space is chosen, as previously described, by address lines A8–A12. The address lines A0–A7 of the RAMs 344 and 352 during the time period are set to 0 by loading a value obtained from the outputs YA-0–YA3, YB0–YB3 of a dual 4-bit driver 354. Address 0 is provided to both of the RAMs 344 and 352 by tying the inputs A0–A3, B0–B3 of driver 354 to ground and by enabling the inputs and the outputs by a low logic level signal *T255. The signal causes address 0 to be presented on submodule address bus 366 to the RAMs. The value for the particular address is taken as the last valid address from the address generator to be stored which is the number non-zero data values out of the 256 possible ones that are contained in the RAM 344. This value is input to the D0–D7 inputs of the memory 344 through a driver 346. The address is presented by enabling of the inputs A0–A3, B0–B3 and the outputs YA0–YA3, YB0–YB3 with the low level logic signal T255. At the same time, a digital value representing the number of events since a particular reference time is loaded through driver 358 onto submodule data bus 364 and input to RAM 352 through its D0–D7 inputs.

To transfer information to or from each FEB, the system provides a transceiver 342 associated with the data bus 362 and a transceiver 360 associated with the data bus 364. The transceiver 342 connects to the data bus 362 at its A0–A7 inputs and to the module data bus 368 at its B0–B7 outputs. The direction which the data travels is determined by the send/receive input S/R of each transceiver 342 and 360, respectively.

For writing data into the FEB, a low logic level of a Read/Write signal R/WBAR is applied to both send receive inputs S/R. A further control signal 0BS is applied to the chip enable input *OE of both the transceiver 342 and transceiver 360. The address to which the data is written is supplied by memory address lines MA2-MA9 of the module bus. These address lines are applied to the A0-A3, B0-B3 inputs of driver 350 and are output from the outputs YA0-YA3, YB0-YB3 upon enablement by a low logic level of signal ENB. The address from the module bus is applied to the submodule address bus 366 and to both address inputs A0-A7 of RAM 344 and 352, respectively. To read data from the FEB, the process is reversed by outputting data from RAMs 344, 352 through transceivers 342, 360, respectively and applying a high logic level of signal R/WBAR. With this configuration, the FEB can be easily loaded from the 8 caches of the input channel circuitry and then be unloaded by either the communications host 26 or the local processor 104 which both have control of the module bus 77.

The generation of the control signals and timing for the FEBs is more clearly detailed in FIG. 12. In general, there is a set of enabling signals for each FEB memory which include the four signals 0BSRW, 1BSRW, 2BSRW and 3BSRW, each being an enabling signal for one of the four submodule groups. Each of these signals are applied to the CE2 inputs of the FEB for the respective groups. Further, there are the timing enable signals, ENA and ENB, which differentiate between the reading and writing of the FEBs by the cache memories and the module buffers. In addition, there is the FEB write enable signal FEBWE which enables the writing of data to all of the FEBs. Still further, there are three enabling signals ASE, BSE and PW which control the reading and writing of data to the width and threshold memories.

The main control signal for enabling the FEB memories during the transfer of data from the caches is the signal DUMP. The DUMP signal is applied to the negative true inputs of OR gates 420, 422, 424 and 426 to generate the enabling signals 0BSRW, 1BSRW, 2BSRW, and 3BSRW for the different submodules. Further, the DUMP signal is combined with the inversion of the time slot signal T255 in an AND gate 428 to produce the enabling signal ENA. The ENA signal is thus asserted during the entire time of the dump except for the last time slot T255 where the word count and event count are written into the respective FEBs. The DUMP signal is also applied to the negative true input of OR gate 430 to assert the FEB write enable signal FEBWE during the entire duration of the dump cycle. These signals thus provide the logic signals needed to write the data which is stored in the cache memories into the FEB memories of the module.

The capabilities of reading the FEBs by means of the local processor 104 or the communication host 26 over the module bus 77 is provided by a portion of the remaining circuitry shown. Memory address lines MA15, MA16, MA17, and MA18 of the module bus 77 are decoded by AND gates 432, 434, 436, 438, 440 and 442 to provide selection signals for the gating of the enabling signals described previously. The four combinations of memory address lines MA15 and MA16 determine which FEB (submodule) is either read from or written to by enabling the submodule enabling signals SUB0-SUB3 from AND gates 444, 446, 448, and 450, respectively. These signals are transmitted through the OR gates 420-426 to become the enabling signals 0BSRW-3BSRW, respectively and enable each FEB. The address selection is necessary because data on the module bus cannot be read or written simultaneously to all buffers and, therefore must be distinguished by address selection. A further enabling signal generated from the combination of memory address line MA17 and the negation of memory address line MA18 by AND gate 442 supplies another enabling signal to AND gates 444-450, respectively. The address and memory space is, therefore, reserved for each FEB of each submodule.

Reading and writing of the FEBs by either the local processor 104 or the communication host 26 can only take place when the data transfer function is not occurring. Therefore, an enabling signal for AND gates 444-450 from AND gate 452 requires that the cache memories not be busy, which is decoded as the inversion of the signal CABUSY, and that the master request signal MAS from the module control bus both be present. The particular time at which the transfer of data from the FEBs to the module bus can occur is set by the enabling signal ENB from AND gate 456. This enabling signal is generated by the coincidence of the selection of the FEB memory space by the output of AND gate 442 and the cache not busy signal. The two signals which select the FEB memory space from gate 442, the master request signal MAS and the R/WBAR signal are combined in AND gate 454 to produce an alternative FEB write enable signal FEBWE by connecting the output of the gate to the other input of OR gate 430. The signal is asserted for either reading or writing, depending on the logic level of the module bus control line R/WBAR. This completes the signals needed to enable the FEB submodules to supply data over the module bus 77 to either the local processor 104 or the communications host 26.

Further, the local processor 104 or communications host 26 can read or write data into the threshold and width memories by generating the enabling signals ASE, BSE and PW. In general, the enabling signals, ASE and BSE, are output from NAND gates 458 and 460, respectively, and select either of the two different banks of threshold and width memory. The last signal in the group, the change address signal PW from NAND gate 462, switches the address multiplexer of the pulse and width memories from the main counter to the memory address lines MA2-MA5. This allows the master of the module bus to either read or write data into those addresses, which select one of sixteen locations.

Memory address line MA6 is applied to NAND gates 458 and 460 to enable the particular bank of 16 memory locations which the address on lines MA2-MA5 is selecting. This provides an advantageous method for picking one of 32 channels for the width and threshold data. The NAND gates 458 and 460 are enabled by the PW signal which is output from NAND gate 62. This signal is the coincidence of the cache not busy signal *CABUSY and the selection of the memory space of the width and threshold memories from the output of AND gate 440. The selection of the memory space is produced by asserting memory address line MA18 and negating memory address line MA17 to the inputs of AND gate 440. The final enabling signal for the NAND gates 458 and 460 is the master request signal MAS, which indicates a module bus transfer.

In FIG. 13, the addresses for each FEB of a submodule are generated by the associated address generators 372, 374, 376 and 378. These address generators will generate the addresses for the memories based on the value of the data input from the cache buses 0-3, respectively, and from data supplied by threshold and width data from memories 380, 382, 384 and 386.

Each memory 380, 382, 384 and 386 comprises a dual 4-word random access memory where each word has four bits. The memories are partitioned such that one of the memories 380 stores threshold values for two submodules and the other memory 382 stores width values for the two submodules and one bit for each group of threshold values. This partitioning provides 16 threshold words and 16 width words for two address generators. The threshold words are 5 bits in length, Z0-Z4, and the width words are 3 bits in length, W0-W2. For example, the threshold values Z0-Z4 for address generator 372 are output from the YA0-YA3 outputs of memory 380 and the YA0 output of memory 382. The corresponding width values W0-W2 for the address generator 372 are output from the YA1-YA3 outputs of memory 382. In a similar manner, the 5 bits of threshold data Z0-Z4 for address generator 374 are output from the YB0-YB3 outputs of memory 380 and the YB0 output of memory 382. Similarly, the 3 bits of width data W0-W2 for address generator 374 are output from the YB1-YB3 outputs from memory 382. An identical memory scheme is provided for memories 384 and 386 for the alternate bank of address generators 376 and 378, respectively.

The Width and threshold memories 380, 382, 384, and 386 are enabled for supplying data to the address generators 372, 374, 376, and 378 unless they are alternatively enabled for being written into. The width and threshold values are read from the memories by applying the timing signals C256, C512, and C1024 from the timing circuit (FIG. 5) to the A0-A2 inputs and the B1-B3 inputs of each memory. This provides the selection of one width value and one threshold value for a respective address generator for each of the eight channels associated therewith.

Writing of the width values into the threshold memories is under the control of the enabling signals ASE, BSE applied to the write enable inputs WE2 of each memory and the module control bus signal R/WBAR applied to the Write enable inputs WEI of each memory. The ASE, BSE signals select the bank to be written and the R/WBAR determines whether data is to be read from or written to the memories 380, 382, 384, and 386. The address which the data is read from or written to is supplied by module memory bus lines MA2-MA5 through multiplexer 388 after selections by the signal EW.

The address counter of each submodule is used to store all non-zero data from the eight cache memories into its respective FEB. There is one address generator per submodule and each acts in parallel to unload the cache memories. The detailed circuitry of one such address counter is more fully shown in FIG. 14. The address generator basically comprises an 8-bit counter 382 whose outputs Q0-Q7 provide the addresses for the FEB memories. The address counter 382 is coupled by its outputs Q0-Q7 to the A0-A7 inputs of an 8-bit register 384. The register stores the particular state or output of the counter 382 at calculated times and then reloads that address into the counter by its connection to the A0-A7 inputs of the counter 382. Circuitry 396 is utilized to determine whether the output from counter 382 should be either the same address as on the previous clock signal, an incremented address, or the address recalled from register 384. Further, the circuit 396 generates control signals which indicate when the output of the counter 382 should be stored in the register 384.

The control circuitry 396 comprises basically two comparators 398 and 390 whose outputs are combined logically in OR gates 386, 388, and 394 to produce the two control signals RECALL and STORE. Comparator 398 is used to produce a comparison between a cache data sample, input to its P0-P7 inputs, and the threshold data sample Z0-Z4, for the particular channel input to its Q0-Q4 inputs. The output of OR gate 394 indicates if P is equal to Q or if P is greater than Q which means that the data sample passes the threshold test and therefore can be tentatively stored. The counter 382 will then advance the address. When a data Value is found to be greater than or equal to the threshold value, after a data value below the threshold, the counter 392 is cleared to begin a new cycle for determining the number of consecutive data samples which are in excess of the threshold. The output of the counter 392 is compared against the word width value W0-W2 in comparator 390 and provides an indication when a data sample extends a sufficient number of clock cycles. This is determinative of an actual event data sample rather than a single sample which can be noise. Thus, when the comparator 390 determines that the number of samples over the threshold exceeds the width value, it stores the current address in register 384. Otherwise, if the number of data samples is not equal to or greater than the width threshold, then the counter 382 is reloaded with the address stored in register 384 via the RECALL signal. Additionally, an override signal OVR is provided for disabling gates 386 and 388 to produce data storage which is without zero suppression. This type of acquisition is used so that data can be read out of the FEBs in a non-zero suppressed form for calibration purposes on the instrument.

FIG. 15 pictorially illustrates the zero suppression function. A data grouping 391, which occurs at TS (n+1) to TS (n+4) passes both the Width test of being at least three samples in length and the threshold test where the data must be in excess of a predetermined amplitude. The second datum 393 is one that passes the threshold test and will be tentatively stored but then will be later discarded (overwritten) because the time slot following it is empty. Those data such as that shown in the third example at 395, however, will elicit no response as they are not even in excess of the threshold level.

Figure 16:
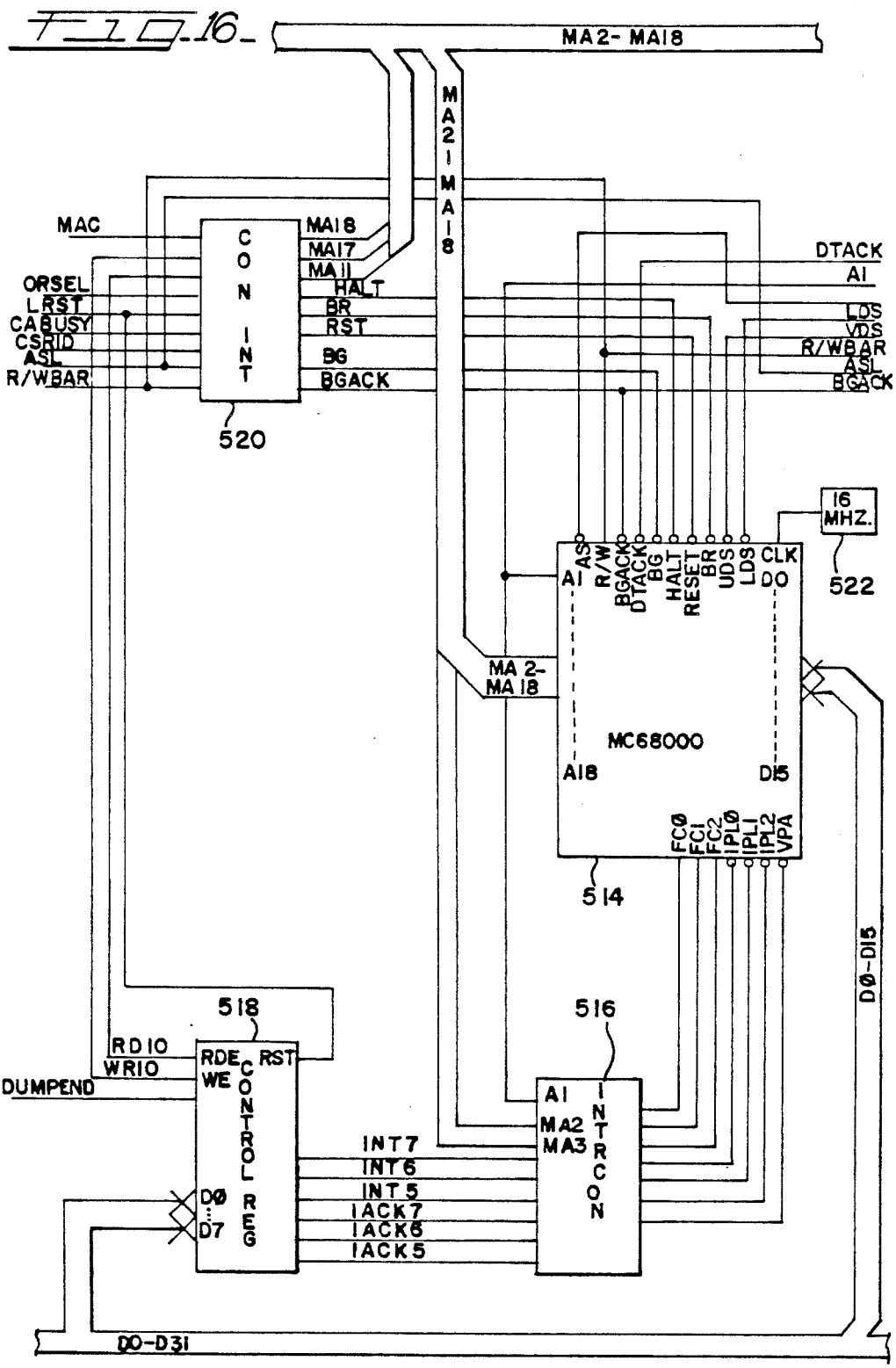
FIG. 16 is a detailed electrical schematic of the local processor, control interface, arbitration logic, control status register, and interrupt control illustrated in FIG. 4.
Figure 17:
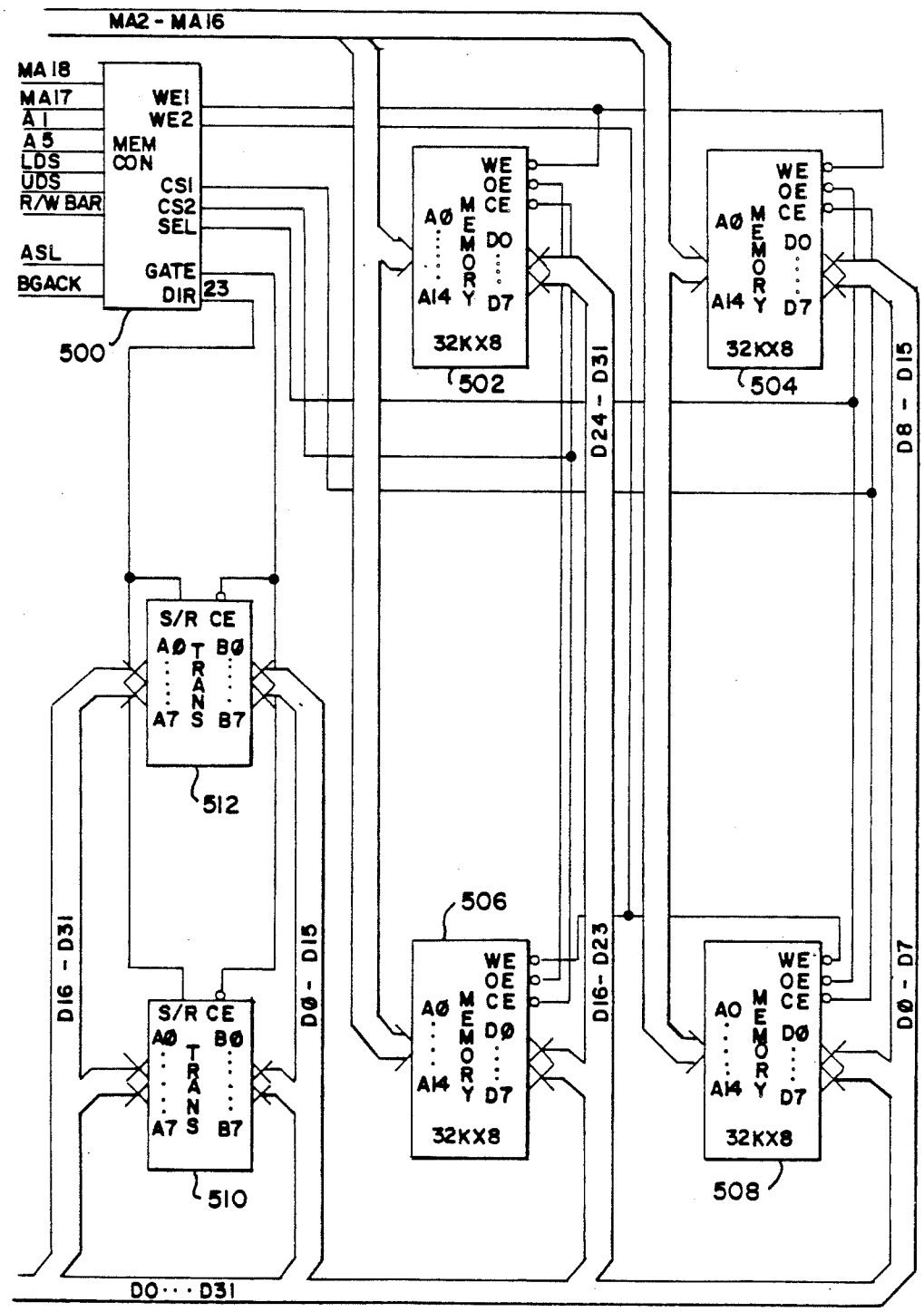
FIG. 17 is a detailed electrical schematic of the module memory, cross connect, and memory control illustrated in FIG. 4.

FIGS. 16 and 17 illustrate a detailed electrical schematic of the local processor 104, module memory 106, memory control, control status register 118 and interrupt control 120. The local processor 104 comprises a microprocessor chip 514 which is implemented as a Motorola 68000 microprocessor having a 16 MHz clock 522. The microprocessor 514 has its data outputs/inputs connected to the module data bus lines D0-D15. The cross connect circuit 128 is shown implemented as two bi-directional transceivers 510 and 512 which can connect module data bus lines D0-D15 to module database lines D16-D31. This is accomplished by generating a low logic level signal GATE to the chip enable inputs *CE of the transceivers 510 and 512. Further, the direction line S/R of each transceiver is selected to input from the B0-B7 side and output to the A0-A7 side. The address outputs A2-A18 of microprocessor 514 become the memory address lines MA2-MA18 of the module address bus. An interrupt control 516 is selected by the memory address lines A1-A3 and provides function code inputs FC0–FC2 and interrupt outputs IPL-0–IPL2. In addition, the interrupt control generates the signal VPA. The interrupt control 516 is set for interrupt by the communications host loading bits into control statue register 518. The control status register 518 receives control signals RD10 and WR10 from control interface 520 to correspondingly either read or write data into the control register from the data bus. Data is written into the control register from the communications host over the module data bus to indicate whether bits 5, 6 or 7 of the register are set to provide interrupts. The dump end signal from the timing control circuit (FIG. 5) further is input to set bit 7 which causes interrupt 7 in the interrupt control 516. The interrupt control 516 replies to an interrupt by servicing it with an interrupt acknowledge which can be stored in the control status register 518. Interrupts which are acknowledged have been cleared while those not acknowledged are still pending. Pending interrupt bits INT5–INT7 can be read by the communications host over the module bus D0–D31, if they have not been acknowledged.

The microprocessor 514 further includes a number of control signals included in the module control bus lines. There are three signals which control direct memory access including signals BG, BR, and BGACK. The signal BR is the bus request signal and is received by the microprocessor 514 to indicate a device is asking for control of the module bus. The microprocessor 514 replies when it has finished its last instruction cycle with a bus grant signal BG. The device taking over the bus replies with a signal BGACK, or a bus grant acknowledge. Further, asynchronous bus control is provided by the control signals R/*W, LDS, UDS, AS, and DTACK. The read/write signal R/W indicates which way data is flowing on the data bus with the respect to the microprocessor 514. A high level signal indicates data is flowing on the module data bus from the microprocessor 514 and a low signal indicates that data is flowing to it from a peripheral. The upper data and lower data strobe lines UDS and LDS respectively indicate which byte of the 16 bit data word is being accessed. The address strobe signal MAS defines the time intervals during which the address lines A1–A18 and function codes, lines FC0–FC2 are valid. A peripheral device notifies the microprocessor 514 when a bus cycle is complete by supplying it with data acknowledge signal DTACK.

The other two control signals used for the microprocessor 514 are the HALT signal and the RESET signal. The HALT signal causes a suspension of the microprocessor operation when it is asserted to the device. Processing begins at the next instruction after which the microprocessor 514 was halted when the signal is terminated. The CABUSY signal from the timing circuitry (FIG. 5) asserts the HALT signal from control interface 520. The application of a RESET signal to the microprocessor 514 causes the device to begin with the address stored at memory location 0 for its next instruction.

The module memory 106 is comprised of four 32K X 8 random access memory chips 502, 504, 506 and 508. The module memory is partitioned into two parts in which a control program which can be executed by microprocessor 514 is stored and a module event buffer which stores the data which is transferred from the four FEBs of the module. The memory chips 502, 504, 506 and 508 form a 32 bit wide memory which is 32K words in length. The module data bus lines D0–D7 connect to the data inputs of memory 508, lines D8–D15 connect to the data inputs of memory 504, lines D16–D23 connect to the data inputs of memory 506, and lines D24–D31 connect to the data inputs of memory 502. The module memory address lines MA2–MA16 connect to the address inputs A0–A14 of memories 502, 504, 506 and 508. The reading and writing of data into the memories is controlled by a memory controller 500. The memory controller provides an enable signal SEL to select the memories at their output enable inputs *OE. Two chip enable signals CS1 and CS2 are applied to the chip enable inputs *CE of the memories to cause pairs of the chips to be chosen. The write enable inputs of the chips WE are selected by the write enable signals WE1 and WE2 of the memory control 500.

The memory control 500 receives the synchronous bus control signals AS, LDS, UDS, R/WBAR from the microprocessor 514 to control reading and writing of data to and from the memories. Memory address lines A17, MA18 are provided to the memory control 500 to indicate which partition in memory the devices are accessing, i.e., FEB, threshold and width memory, program memories, or module event buffer. The address strobe signal ASL from the communications coupler 102 and the bus grant acknowledge signal BGACK are also provided to the memory control 500 to provide arbitration logic. When the upper 16-bits of a 32-bit word is addressed by the microprocessor 514, the transceivers 510 and 512 shift the upper half of the word onto the data lines D0–D15 which the microprocessor can accept. The communications coupler can load or unload data in 32 bit words via the data bus D0–D31.

Program execution by the microprocessor 514 is controlled by the control register 518 which is a register in the communications coupler control space. Bit 0 of this register is an enable bit, and bits 5, 6 and 7 are used to generate interrupts to the microprocessor 514. When bit 0 is cleared by the communications coupler, the microprocessor 514 is put into the reset state by asserting its halt and reset lines. When bit 0 is set, the reset state is terminated, and the microprocessor begins execution at its reset vector. The reset state is also entered when the power is turned on, after a reset bus command from the communications coupler, or when the module is manually reset from a switch. When bit 5, 6 or 7 is set, it causes an interrupt to the microprocessor 514 with a priority at 5, 6 or 7, respectively. Each interrupt bit may be cleared by the appropriate access to the control status register 518 when the microprocessor 514 acknowledges the interrupt. If more than one interrupt bit is set, the interrupts will occur sequentially in the correct order of priority. Because the communications coupler has access to the module memory, the communications host can change the interrupt vector in the program memory before sending an interrupt, thus, using a single interrupt level for many purposes. Normally, when the board is first powered up, the processor is disabled by holding it in the reset state. The communications host then downloads a program into the module memory including an interrupt vector and program instructions before enabling the microprocessor 514 with bit0 of the control register 518.

Because of extreme sensitivity of the analog portion of the system, extra noise on the analog signals should be carefully avoided. This noise is controlled by suspending all digital processing activity of the local processors while the module is accepting analog data from the sensors. To do this, the signal CABUSY is used to assert the HALT signal to the microprocessor 514. This causes the microprocessor 514 to suspend all activity until the cache busy signal is terminated at which time the processor resumes with its normal functions.

Figure 19:
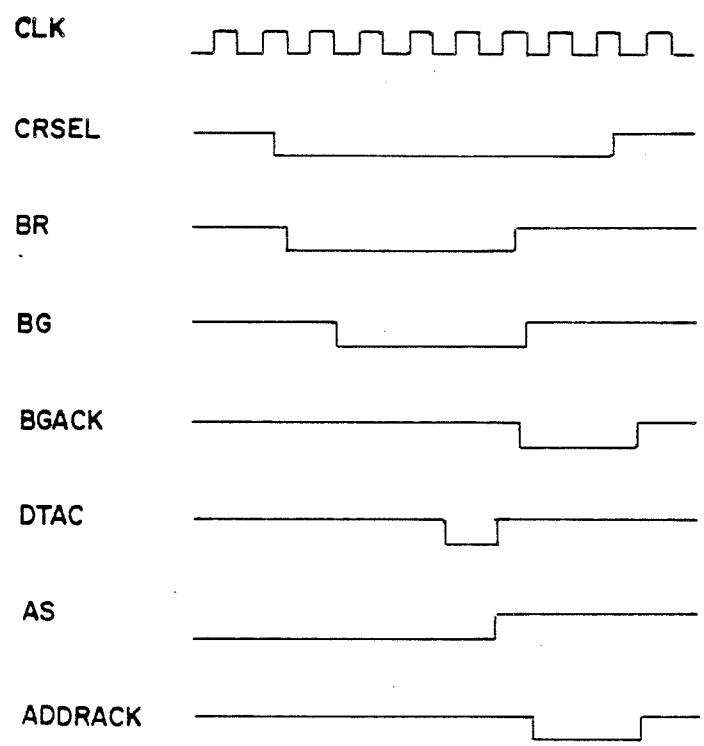
FIG. 19 is a pictorial representation of timing waveforms representing a communication between the FASTBUS backplane and the FASTBUS coupler illustrated in FIG. 18.

Because they share the same bus, the communication coupler and the microprocessor 514 must arbitrate when a conflict arises. In the case of conflict, the system gives priority to the communications coupler although there is provided a means for a the microprocessor 514 to lock out the communications coupler during critical operations. The timing diagram for this operation is illustrated in FIG. 19. When the communication coupler detects that the module is being addressed by the communications host, it asserts a signal ORSEL, which is the logical OR of signals indicating geographical, logical or broadcast address selection. The signal ORSEL causes a bus request BR to the microprocessor 514 which responds with a bus grant signal at the end of the current bus cycle. Upon receipt of the bus grant signal BG, the communications coupler asserts and holds the bus grant acknowledge signal for the module and sends an address acknowledge signal to the FASTBUS bus master. Upon receiving the address acknowledge signal (ADDRACK), the communications coupler sends the response AK to the FASTBUS bus master, in our case communications host 26.

The microprocessor 514 further has the ability to address the control status register 518 as it is provided as an address in the data space of the device. This allows the microprocessor 514 to read and modify the control status register 518 contents. Another register which is termed the "flag register" is provided in the data space and contains three bits which cause the communications coupler to perform specific actions as specified in the FASTBUS standard. The first bit of this group is a "data ready" bit which one set causes the communication coupler to respond to a T-pin scan case 3. The second bit is a "free for use" bit for use in T-pin scan case 3A. The third bit is a "module busy" and locks out the communication coupler from taking the module bus. When this bit is set, the communications coupler will respond with SS=1 (busy) to any communications host attempt to access the module. All of these three bits can be set either by the microprocessor 514 or the communications coupler.

Figure 18:
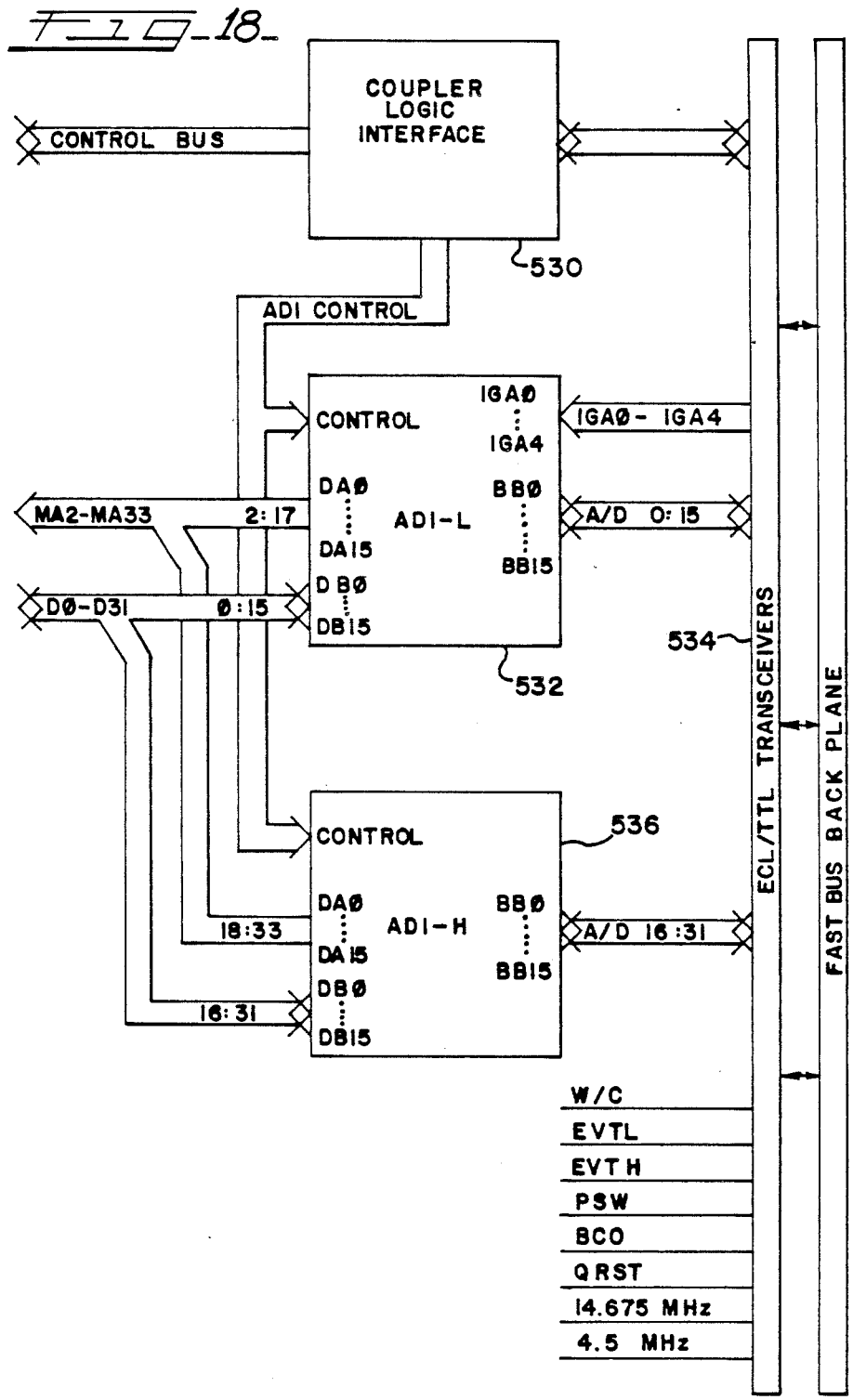
FIG. 18 is a detailed block diagram of the FASTBUS coupler illustrated in FIG. 4.

FIG. 18 illustrates a detailed block diagram of the communications coupler which interfaces the module bus to the FASTBUS back plane. The communications coupler comprises a plurality of ECL/TTL transceivers 534 which connect to FASTBUS back plane signal lines (ECL) on one side and to chip inputs and outputs (TTL) on the other side. The communications coupler further includes a coupler logic interface 530 and two ADI multiplexers 532 and 534. Because the FASTBUS definition contains a 32-bit multiplexed address and data bus, the demultiplexers 532 and 534 are used to separate them into the address bus and data bus for the module bus 77. ADI 532 demultiplexes the low 16 bits of the FASTBUS address/data bus, A/D 0:15. The bus is input to the BB0-BB15 inputs of ADI 532. In a similar manner, the higher order bits of the address/data bus of the FASTBUS back plane, A/D 16:31, are received by inputs BB0-BB15 of ADI 534. The signals on these address/data bus lines are demultiplexed into the module memory address lines MA2-MA33 from the DA0-DA15 outputs of ADI 532 and ADI 534, respectively. The module data bus D0-D31 is demultiplexed from the DB0-DB15 ports of ADI 532 and ADI 534, respectively. The multiplexing or demultiplexing of the busses is under the control of the coupler logic interface 530 by means of an ADI control bus. The ADI control bus is applied to the control inputs of ADI 532 and ADI 534 to make transparent the multiplexed and demultiplexed nature of the two busses.

In addition to controlling the two ADI multiplexers, the control interface 530 receives control signals from the FASTBUS back plane which are transformed into control signals for the module control bus. Conversely, the control signals from the local processor and arbitration circuitry are transformed into FASTBUS control signals input through the transceivers 534 to the communications host 26.

A system flow chart for the data acquisition system is illustrated in FIG. 20. To begin in block A10, the communication host 26 will call a subroutine initialize which will communicate with all the modules of the system over the communications coupler 102 to produce initial setups for the system. After initialization, the program will determine whether the system should be calibrated. If calibration is not required, then there will be a determination in block A22 whether data acquisition is necessary. If data acquisition is not necessary, then the system continues at block A26 where a decision is made whether to exit. If the decision is made to exit, then the program returns and can be recalled at a later time. If the decision is made in block A26 not to exit, then a loop is formed where blocks A12, A22 and A26 are passed through until the exit command is given.

If the decision is made that the system should be calibrated in block A12, then in block A14, a decision is made whether or not a threshold calibration should be made and in block A16 whether the gains should be calibrated. If the thresholds have not been calibrated, then the program will call an auto-calibration routine and block A18 before testing whether the gains need calibration. Similarly, in block A16, if the gains are not calibrated, an auto-calibration routine is called in block A20. Moreover, if data is to be acquired, then a data acquisition program is called in block A24.

FIG. 21 is a more detailed flow chart of the subroutine initialize which is called in block A10 of the system program. Initially, in block A28, the communication host will write the widths and thresholds needed for the system into the width and threshold memories of each module. In the next step, the software which is to be executed by each local processor of a module is downloaded through the communications coupler. For the preferred example, the program will do an auto-calibration for thresholds and gains. In addition, software is downloaded into each local processor which is adapted to compress the data from the FEB into clusters and reformat the data for transfer to the communications host.

Next in blocks A32 and A34, the module numbers and the first pad number of the modules are written into each module memory. Because the physical modules can be moved in the back plane and all are identical, this step is to provide a system configuration which is readily adaptable. Further, the time and date of the downloading operation may be stored in each module memory so that the communication processor can later query each module as to its software version. This ensures that a current program for each module is operating. Next, the run bit in the control status register of a module is set in block A38 before the communication host releases the FASTBUS coupler in block A40 by releasing the AS/AK lock. The local processors will thereafter run their programs under interrupt control, and the system will function on the trigger signals and general broadcast signals given by the communications host.

Figure 22:
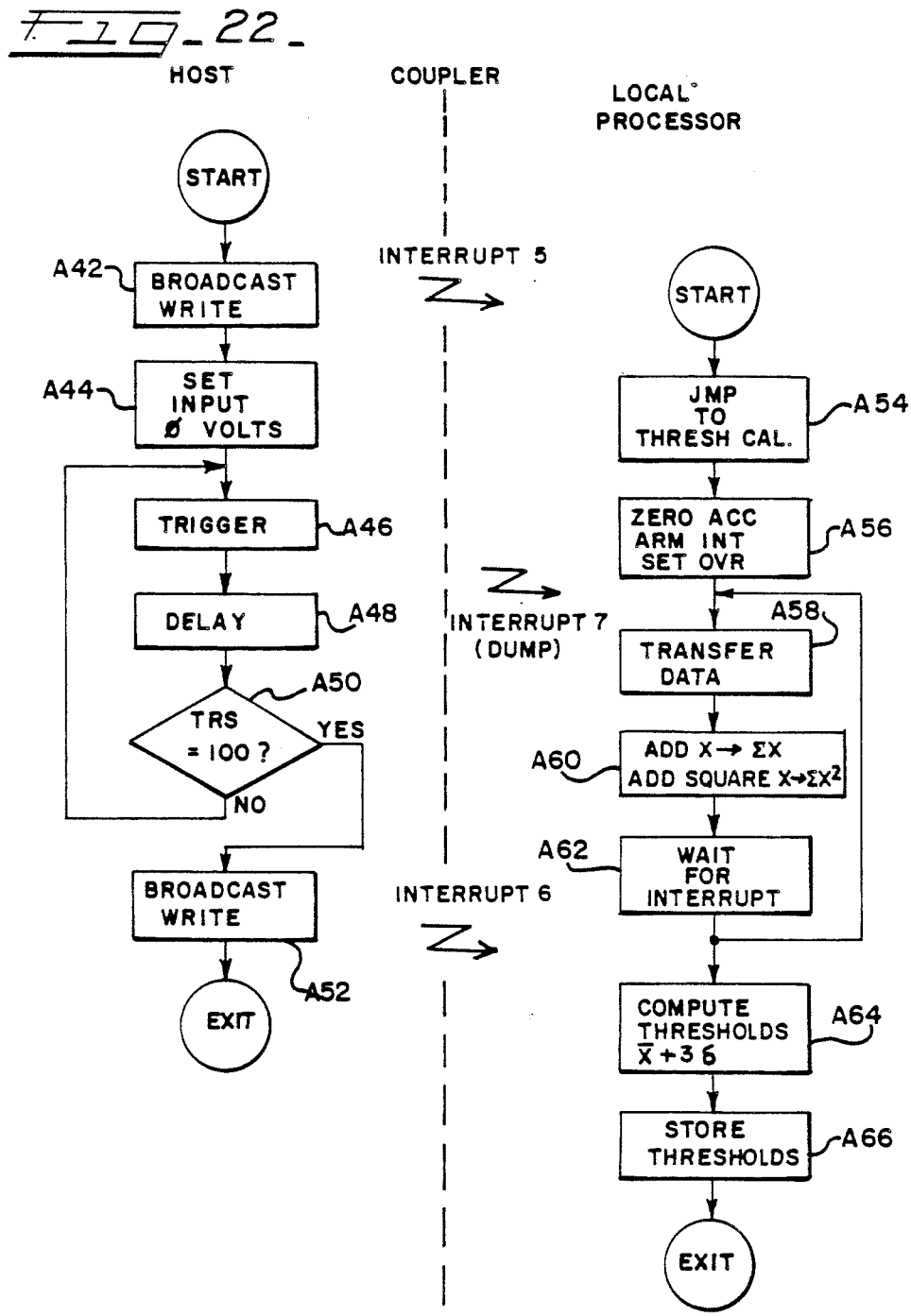
FIG. 22 is a detailed system flow chart of a threshold calibration operation.

FIG. 22 illustrates a detailed flow chart for a threshold calibration which takes place automatically by the local processors, but under control of the communications host. The functional flow charts illustrates the actions taken by the communications host in relationship to those actions taken by the local processor of each module. The communications between the host and the modules is represented as a dotted line.

Initially, the host begins the process by a broadcast write of interrupt 5 over the communications coupler. This will cause the local processor 104 to recognize the interrupt and jump to the threshold calibration program, which is stored in the module memory in block A54. Further, the local processor in block A56 will zero the accumulators where the calibration data is to be stored, arm the interrupt which recognizes the end of a dump cycle, and will set the override signal so that no zero suppression will take place. The local processor will then wait for the dump interrupt. The host, on the other hand, will set the input voltage for the sensors to zero volts in block A44 and then produce a trigger pulse in block A46. The system will convert the zero volts of the sensors into digital data and dump that data into the FEBs of each module. When the process is complete, interrupt 7 will cause the local processor to transfer that data to the module memory in block A58. During the transfer, the data will be added for each channel such that the summation of data for each channel is kept in block A60, and the sum of the squares of the data for each channel is kept. The host will delay after giving a trigger enough time to allow all of the local microprocessors to do these calculations before continuing to block A50. If the number of triggers is not 100, then the process will be repeated. Thus, the process of taking an average of 100 samples for each channel for each module will continue until the host determines that the number of triggers is equivalent to the data which should be taken. At that point, the program will flow to block A52 where a global broadcast write of interrupt 6 is generated causing each local processor then to begin the computation of the thresholds. The average value for when the input to the channels is zero volts is a pedestal value. To compute the threshold, the summation of the squares of the input value is used to calculate a standard deviation of the input data for each channel. With the mean and the standard deviation, a threshold is generated, for example, as the mean value plus three standard deviations from the mean. If a data value is an excess of this threshold, it is therefore statistically probable that it is non zero. In block A66, these thresholds are then stored before the local processor exits the program.

Figure 23:
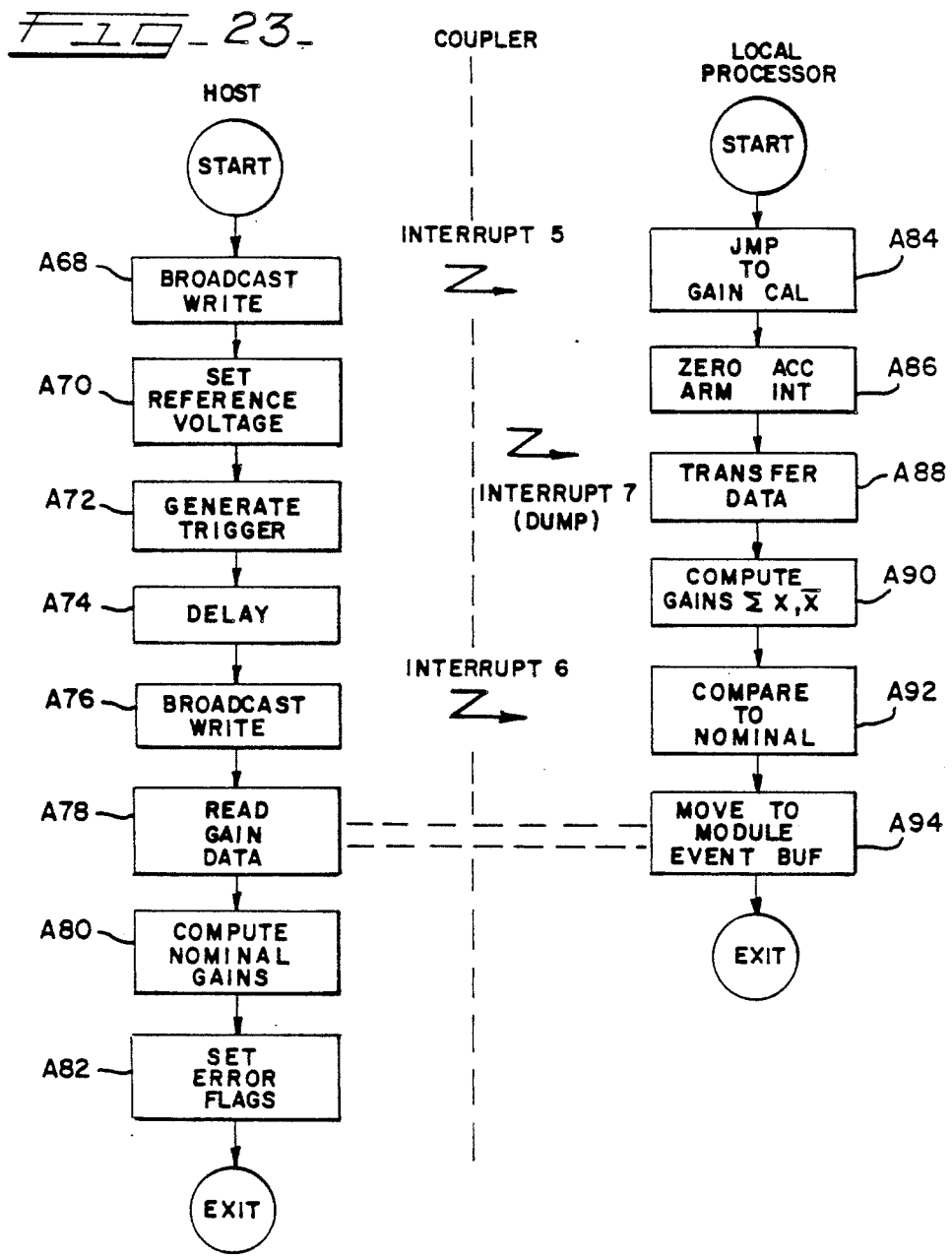
FIG. 23 is a detailed system flow chart of a gain computation operation.

FIG. 23 illustrates the detailed flow chart for the automatic gain calibration. As with the threshold calibration, the host begins the process with a broadcast write command in block A68, which generates interrupt 5 over the communications coupler. Interrupt 5 causes the local processor in each module to jump to its gain calibration program in block A84. This will zero the accumulators for each channel and will arm the dump interrupt in block A86. The host during this time sets a reference voltage on the input sensors in block A70. This reference voltage should produce a set digital number dependent on the gain of each FADC. The host then generates a trigger pulse in block A72 and delays while the system is converting the reference voltage into digital numbers. When the conversion is completed, the system provides a interrupt 7 (end of dump interrupt) to the local processor, and the local processor will begin to transfer the data from the FEBs. The local processor computes the gains in block A90 by summing the 256 samples for each channel and then by calculating a mean for that channel. In the interim, the host, after the time necessary for the conversion and transfer, will generate a broadcast write in block A76 to produce interrupt 6. Interrupt 6 will cause the local processors of each module to jump to their comparison programs in block A92 where the calculated numbers are compared to nominal gain values for each channel. Based upon the comparisons, particular error bits in each gain value that was measured can be set to alert the host that a channel is out of calibration. After these error bits are set, the host in block A78 will read the gain data from each module by doing a block read from a particular area of the module event buffer to which the data has been moved in block A94. The data that is read from the entire system can be used to recompute gains as in block A80 or to set error flags for the system in block A82.

FIG. 24 illustrates the data which is stored in the module event buffer in response to the reformatting and the data compression supplied by the data acquisition program of the local processor. The data in the FEBs contains all the nonzero data which the event has produced and is in the form of an amplitude value and a time slot value. Normally, the type of data which the present system is attempting to accumulate is clustered in groups of consecutive time slots and does not usually occur as individual samples. In fact, with the width criteria which is set for the present system, three data samples requires the data will at least be clustered in groups of three. Therefore, a data reduction method can be used to discard a number of extraneous data which are the time slot values. Because of the natural clustering of the data, data clusters can be described by the channel number, the first time slot at which a cluster begins and how many data samples are in the cluster.

Thus, the format in FIG. 24 has been provided not only to perform the data compression technique of clustering, but also to put the data into an acceptable format for block transfer to the communications host. Each data group is a blocklet of 32-bit words. The first word is reserved for the word count of the blocklet and the second word reserved for 16 bits of error flags and 16 bits of a description of the type of data in the blocklet, in this case, cluster data. The third word in the blocklet includes the module number in the first byte and the number of the first channel or pad in the second byte. There follows a byte for the data size and another byte for a trigger accounting number. Thereafter, there are included sets of cluster data for each of the channels of the module which have data. The cluster data is formatted into a first word for each channel wherein the first two bytes are the channel number and the second and third byte is the word count for the channel, and the fourth byte is the number of clusters for the channel. Each cluster format follows in which the first half word is the value of the first time slot in a cluster and is followed by the second half word which indicates the number of amplitudes in the cluster. Following this format word for the cluster, there is the values of the amplitudes in byte format A0–A7. After all the data for one channel has been formatted in this manner, the last word is filled with zeroes to regain 32-bit alignment. Thereafter, the next channel is stored in the same format until all channels have been recorded. The blocklet ends with a full word of word count identical with the first word.

While a preferred embodiment has been shown and described in detail, it will be obvious to those skilled in the art that various modifications and changes may be made thereto without departing from the spirit and scope of the invention as defined in the appended claims.

What is claimed is:

1. A multiple channel data acquisition system for converting analog signals from a multiplicity of data channels into digital data samples and for transferring the data samples to a host processor, said data acquisition system comprising:
   a plurality of data acqustion modules, each including a local processor means, module memory means, channel conversion means, front end buffer (FEB) means, and communications coupling means;
   a high speed communication pathway which couples each communications coupling means of a respective module to the host processor;
   each of said data acquisition modules further including a module bus for coupling said FEB means, said module memory means, said local processor means, and said communication coupling means, said module bus adapted for bidirectional communications between said FEB means and said module memory means, said FEB means and said communications coupling means, or said module memory means and said communications coupling means;
   said channel conversion means including means for periodically converting the analog signals from at least one of said data channels into the data samples, cache memory means, means for storing the data samples in said cache memory means, and means for periodically transferring the data samples stored in said cache memory means to said FEB means;
   wherein said host processor controls communications between said communications coupling means and said module memory means or said FEB means; and
   wherein said local processor controls communications between said module memory means and said FEB means or said communications coupling means.

2. The multiple channel data acquisition system as set forth in claim 1 wherein said means for periodically transferring said data samples stored in said cache memory means to said FEB means includes:
   means for processing said data samples in accordance with information contained in the data samples stored in said cache memory means.

3. The multiple channel data acquisition system as set forth in claim 2 wherein said means for processing includes:
   means for compressing the data samples stored in said cache memory means.

4. The multiple channel data acquisition system as set forth in claim 3 wherein said means for compressing the data samples stored in said cache memory means includes:
   means for discarding data samples which are less than a predetermined threshold value.

5. The multiple channel data acquisition system as set forth in claim 3 wherein said means for compressing the data samples stored in said cache memory means includes:
   means for discarding data samples based upon information contained in two or more consecutive data samples.

6. The multiple channel data acquisition system as set forth in claim 5 wherein said means for discarding includes:
   means for discarding data samples which are less than a predetermined threshold value or are not preceded by n data samples or followed by n data samples which are greater than or equal to said threshold value, n being an integer value or zero.

7. The multiple channel data acquisition system as set forth in claim 1 wherein said means for periodically transferring said data samples from said cache memory means to said FEB means comprises:
   address generation means for reading data samples from said cache memory means at a read address and for writing data samples to said FEB mean at a write address.

8. The multiple channel data acquisition system as set forth in claim 7 wherein said address generation means includes:
   means for comparing the digital value of a read data sample to an amplitude threshold;
   means for incrementing the read address to read the next data sample;
   means for incrementing the write address if the digital value of said compared data sample is greater than said threshold; and
   storing the next data sample at the write address.

9. The multiple channel data acquisition system as set forth in claim 8 wherein said address generator means further includes:
   means for storing said write address if said present data sample is greater than said amplitude threshold;
   means for comparing the number of consecutive data samples thereafter in excess of a width threshold;
   means for resetting said write address to said stored address if said comparison is not in excess of said width threshold.

10. The multiple channel data acquisition system as set forth in claim 9 which further includes:
    amplitude threshold memory means for storing said amplitude threshold at a memory location corresponding to a particular data channel; and
    width threshold memory means for storing said width threshold to a memory location corresponding to a particular data channel.

11. The multiple channel data acquisition system as set forth in claim 1 wherein:
    said module memory means is partitioned into a program buffer means for storing instructions executable by said local processor means and a module event buffer means for storing data samples transferred from said FEB means; and
    said local processor means includes means for executing said instructions stored in said program buffer means to control the transfer of said data samples from said FEB means to said module event buffer means.

12. The multiple channel data acquisition system as set forth in claim 11 wherein:

said program buffer means comprises random access memory which is addressable by said communications coupling means.

13. The multiple channel data acquisition system as set forth in claim 12 which further includes:
means for downloading said executable instructions through said communications coupling means to each module memory means.

14. The multiple channel data acquisition system as set forth in claim 11 wherein:
said module event buffer means comprises random access memory which is addressable by said communications coupling means.

15. The multiple channel data acquisition system as set forth in claim 14 which further includes:
means for uploading said stored data samples from each module event buffer through said communications coupling means.

16. The multiple channel data acquisition system as set forth in claim 11 wherein:
said local processor means includes means for executing said instructions stored in said program buffer means to process said data samples during transfer from said FEB means to said module event buffer means.

17. The multiple channel data acquisition system as set forth in claim 16 wherein:
said means for executing instructions processes said data samples into a format compatible with said host processor.

18. The multiple channel data acquisition system as set forth in claim 16 wherein:
said means for executing instructions processes said data samples according to a characteristic of the data.

19. The multiple channel data acquisition system as set forth in claim 18 wherein:
said means for executing instructions compresses said data samples based upon whether any data samples are stored in said FEB means.

20. The multiple channel data acquisition system as set forth in claim 19 wherein:
said means for executing instructions communicates with said uploading means to indicate whether any data samples have been transferred to said module event buffer means.

21. A method for converting the analog signals from a multiplicity of data channels into digital data samples and for transferring the data samples to a host processor, said method comprising:
sampling the multiplicity of data channels in parallel in response to a trigger signal by the host processor to generate the data samples;
storing the data samples of each channel into an associated multiplicity of first memories;
transferring said data samples from a plurality of channels stored in said first memories into an associated multiplicity of second memories;
processing said data samples into processed data samples during said transfer from said first to said second memories;
transferring said processed data samples from a plurality of second memories into an associated multiplicity of third memories;
processing said processed data samples into information samples during said transfer from said second to third memories; and
transferring said information samples from each of said third memories to said host processor.

22. The conversion method as set forth in claim 21 wherein said step of sampling includes:
sampling a plurality of sequential data samples during a load period of specific duration.

23. The conversion method as set forth in claim 22 wherein said step of transferring said data samples from said first memories to said second memories includes:
sequentially transferring all data samples from one channel before transferring the data samples of the next channel in the plurality of channels during a dump period of specific duration.

24. The conversion method as set forth in claim 23 wherein:
said step of sampling is accomplished at a higher rate than said step of transferring data samples from said first to second memories.

25. The conversion method as set forth in claim 23 wherein said step of transferring said processed data from said second to said third memories includes:
halting said processing step during said load and dump periods.

26. The conversion method as set forth in claim 23 wherein said step of processing said data samples includes:
compressing said data samples into fewer data samples.

27. The conversion method as set forth in claim 26 wherein said step of compressing includes:
discarding data samples which have less amplitude than a threshold.

28. The conversion method as set forth in claim 27 wherein said step of discarding includes:
writing said discarded data samples into said second memory;
determining whether said discarded data samples are less than said threshold;
overwriting said discarded data samples with data samples which are in excess of said threshold.

29. The conversion method as set forth in claim 26 wherein said step of compressing includes:
discarding data samples which have less width than a threshold.

30. The conversion as set forth in claim 21 wherein said step of processing said processed data samples includes:
formatting said information samples for transfer to said host processor.

* * * * *

UNITED STATES PATENT AND TRADEMARK OFFICE
CERTIFICATE OF CORRECTION

PATENT NO. : 4,928,246
DATED : May 22, 1990
INVENTOR(S) : Crawley et al.

It is certified that error appears in the above-identified patent and that said Letters Patent is hereby corrected as shown below:

Column 2, line 6, after "energies", insert -->--.

Column 2, line 39, after "transfer", delete --o--.

Column 3, line 1, after "digital" delete --o--.

Column 3, line 19, after "threshold", insert --amplitude and a threshold duration or width. The data--.

Column 3, line 22, after "retained", insert --or not--.

Column 3, line 23, before "data", insert --the--.

Column 3, line 49, "thus" should be --bus--.

Column 3, line 62, after "data", delete --o--.

Column 5, line 61, after "is" delete --L--.

Column 6, line 25, "durinq" should be --during--.

Column 7, line 44, "Will" should be --will--.

lines 35 and 36, space should be closed between them.

UNITED STATES PATENT AND TRADEMARK OFFICE
CERTIFICATE OF CORRECTION

PATENT NO. : 4,928,246
DATED : May 22, 1990
INVENTOR(S) : Crawley et al.

It is certified that error appears in the above-identified patent and that said Letters Patent is hereby corrected as shown below:

Column 9, line 66, "Which" should be --which--.

Column 11, line 14, "inverter" should be --invertor--.

Column 12, line 2, after "are" insert --necessary to--.

Column 13, line 1, "S16" should be --316--.

Column 14, line 1, "*CEI" should be --*CE1--.

Column 15, line 56, after "shown", insert --in the figure--.

Column 17, line 27, "Width" should be --width--.

Column 17, line 42, "Write" should be --write--.

Column 18, line 14, "Value" should be --value--.

Column 18, line 39, "Width" should be --width--.

Column 19, line 5, "statue" should be --status--.

UNITED STATES PATENT AND TRADEMARK OFFICE
CERTIFICATE OF CORRECTION

PATENT NO. : 4,928,246
DATED : May 22, 1990
INVENTOR(S) : Crawley et al.

It is certified that error appears in the above-identified patent and that said Letters Patent is hereby corrected as shown below:

Column 20, line 21, "Which" should be --which--.

Column 24, line 24, "bIock" should be --block--.

Column 26, lines 3-4, "incudes" should be --include--.

Column 26, line 22, "mean" should be --means--.

Column 28, line 54, after "conversion", insert --method--.

Signed and Sealed this

Thirteenth Day of October, 1992

*Attest:*

DOUGLAS B. COMER

*Attesting Officer*  Acting Commissioner of Patents and Trademarks